United States Patent [19]
Nagata et al.

[11] Patent Number: 5,633,759
[45] Date of Patent: May 27, 1997

[54] ZOOM LENS SYSTEM

[75] Inventors: Hideki Nagata, Sakai; Soh Ohzawa, Toyonaka; Hiroyuki Matsumoto, Wakayama; Masakuni Tai, Machida, all of Japan

[73] Assignee: Minolta Camera Co., Ltd., Osaka, Japan

[21] Appl. No.: 529,294

[22] Filed: Sep. 15, 1995

[30] Foreign Application Priority Data

Sep. 20, 1994 [JP] Japan .................................. 6-224455
Sep. 20, 1994 [JP] Japan .................................. 6-224456

[51] Int. Cl.$^6$ ................................................ G02B 15/14
[52] U.S. Cl. ........................................................ 359/686
[58] Field of Search ................................ 359/686, 684

[56] References Cited

U.S. PATENT DOCUMENTS

| | | | |
|---|---|---|---|
| 4,345,821 | 8/1982 | Tachihara | 359/686 |
| 4,345,822 | 8/1982 | Tachihara | 359/686 |
| 4,592,626 | 6/1986 | Fujii | 359/686 |
| 4,629,294 | 12/1986 | Tanaka et al. | 359/686 |
| 4,639,096 | 1/1987 | Kitagishi et al. | 359/686 |
| 4,673,248 | 6/1987 | Masumoto | 359/686 |
| 4,673,258 | 6/1987 | Masumoto | 359/686 |
| 4,701,033 | 10/1987 | Masumoto | 359/686 |
| 5,272,566 | 12/1993 | Aoki | 359/686 |
| 5,493,447 | 2/1996 | Ohtake | 359/686 |

FOREIGN PATENT DOCUMENTS

| | | | |
|---|---|---|---|
| 63-113410 | 7/1988 | Japan . | |
| 1197713 | 4/1989 | Japan . | |
| 0181716 | 7/1990 | Japan | 359/686 |
| 0207210 | 8/1990 | Japan | 359/686 |
| 0230209 | 9/1990 | Japan | 359/686 |
| 453916 | 11/1992 | Japan . | |
| 405224124 | 9/1993 | Japan | 350/686 |

Primary Examiner—Georgia Y. Epps
Assistant Examiner—Evelyn A. Lester
Attorney, Agent, or Firm—Price, Gess & Ubell

[57] ABSTRACT

A zoom lens system of the invention is double telephoto type zoom lens system having a positive/negative/positive/negative refractive power arrangement. During zooming from the wide angle side toward the telephoto side, the first through fourth lens units move such that the distance between the first and second lens units increases and the distance between the third and fourth lens units decreases. The refractive power of the first lens unit and the refractive power of the fourth lens unit are appropriately prescribed so that an adequate back focal lens distance is preserved.

13 Claims, 18 Drawing Sheets

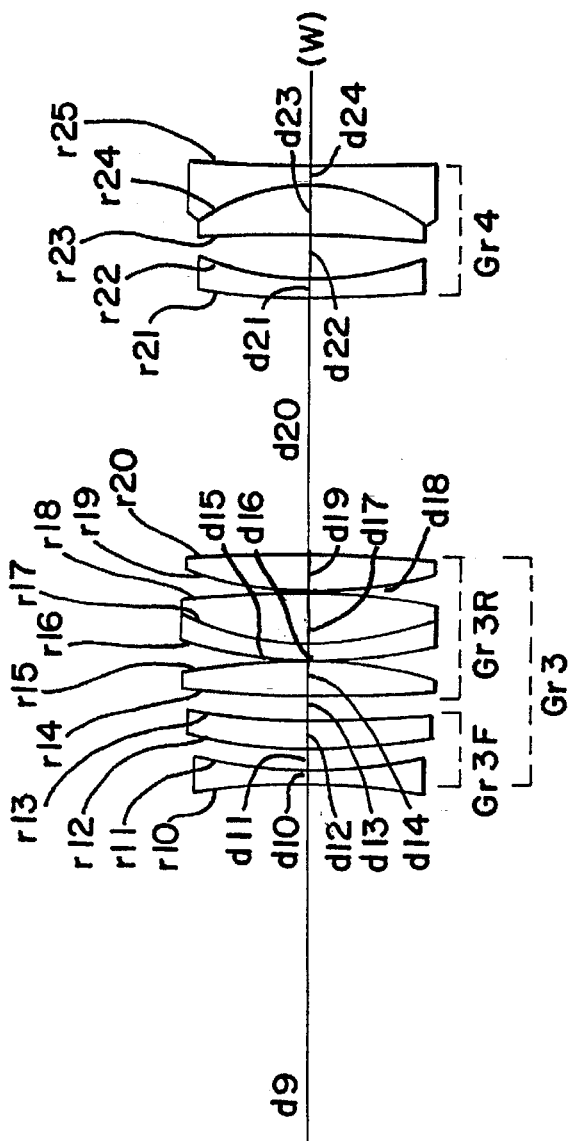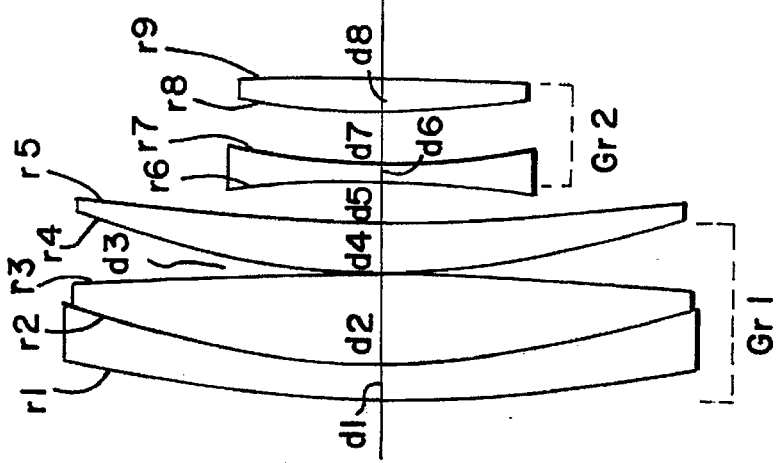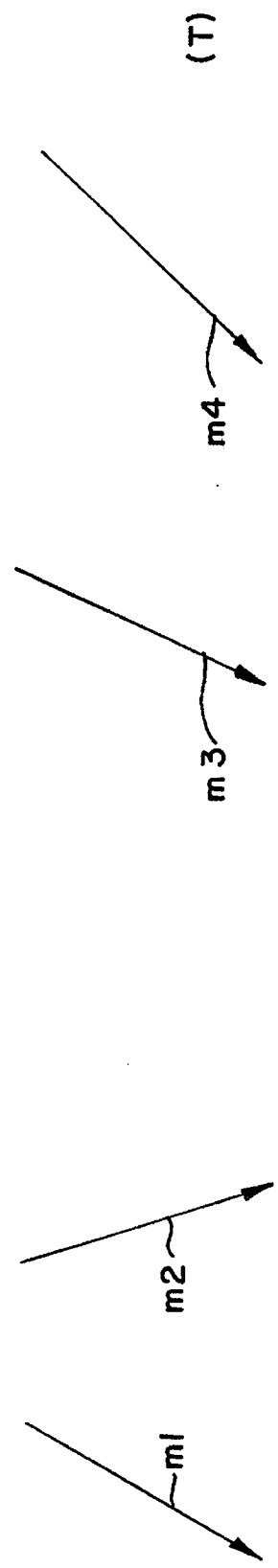
FIG. 2

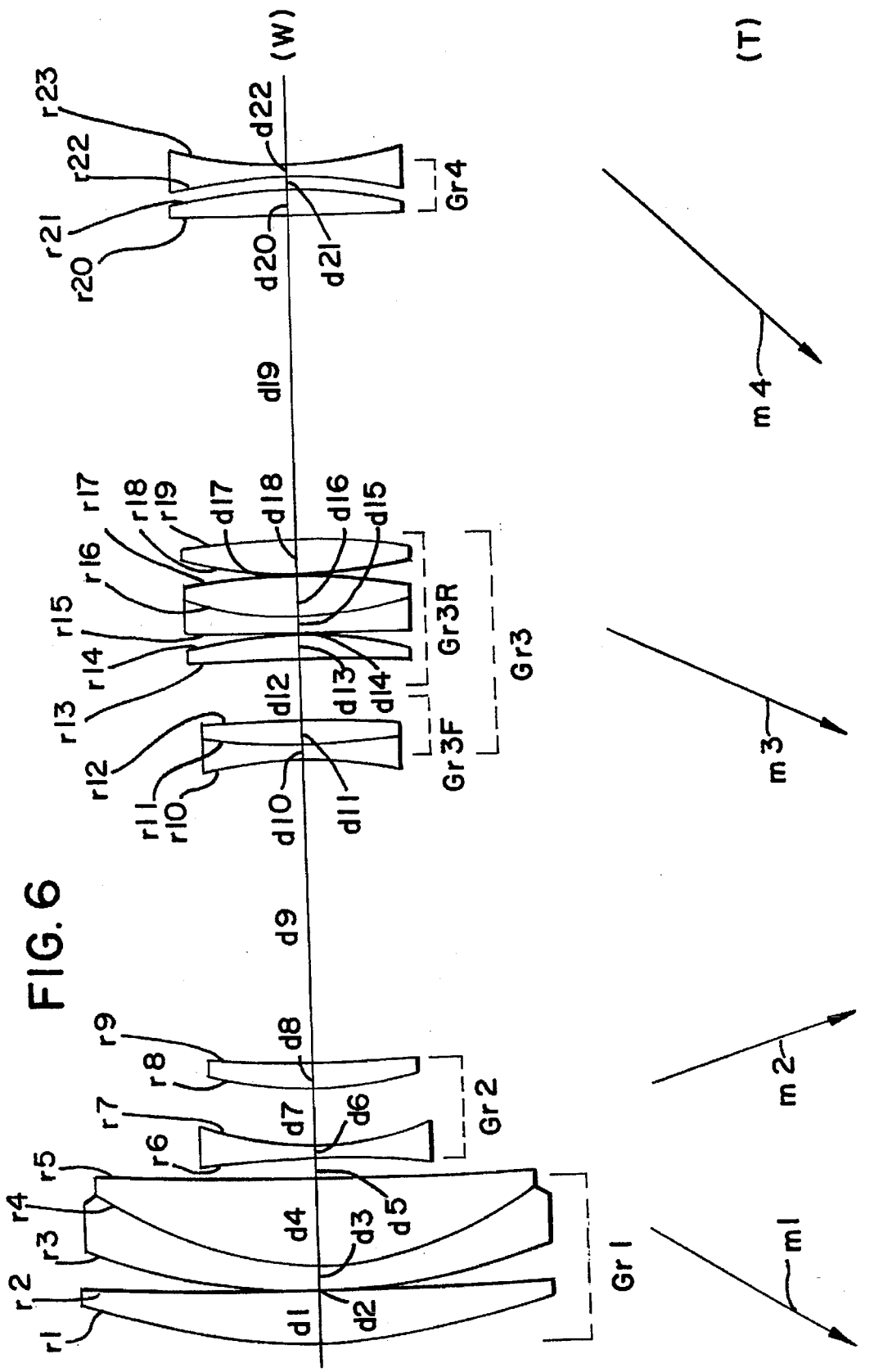

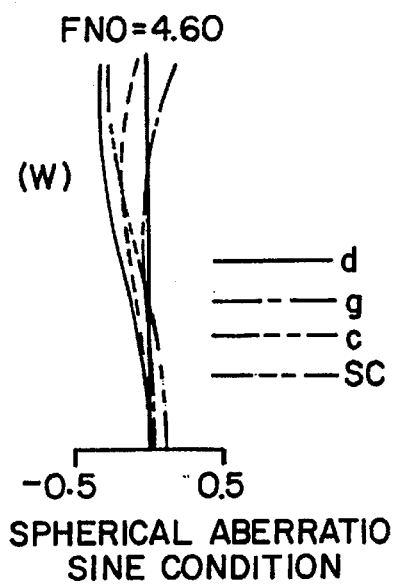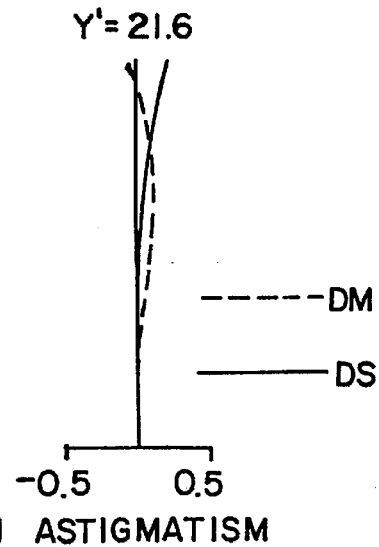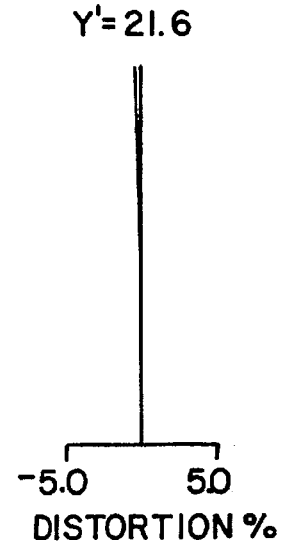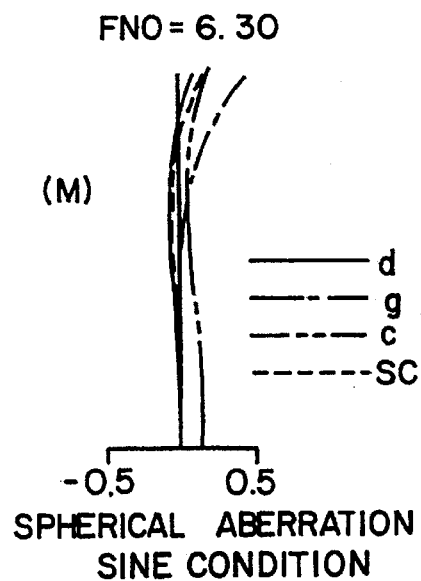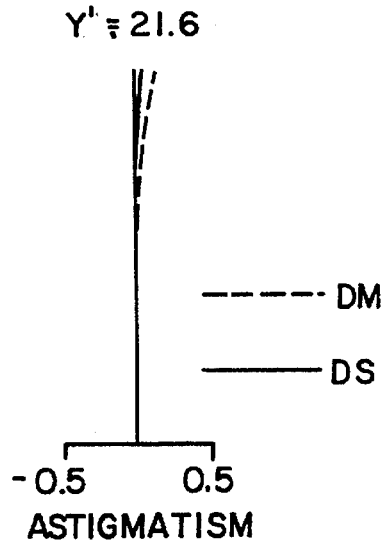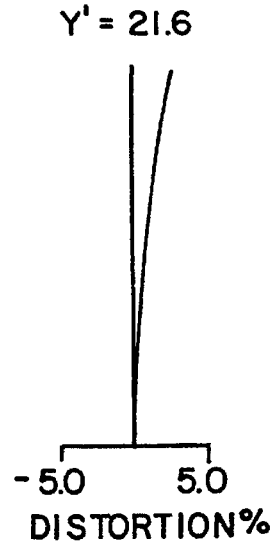

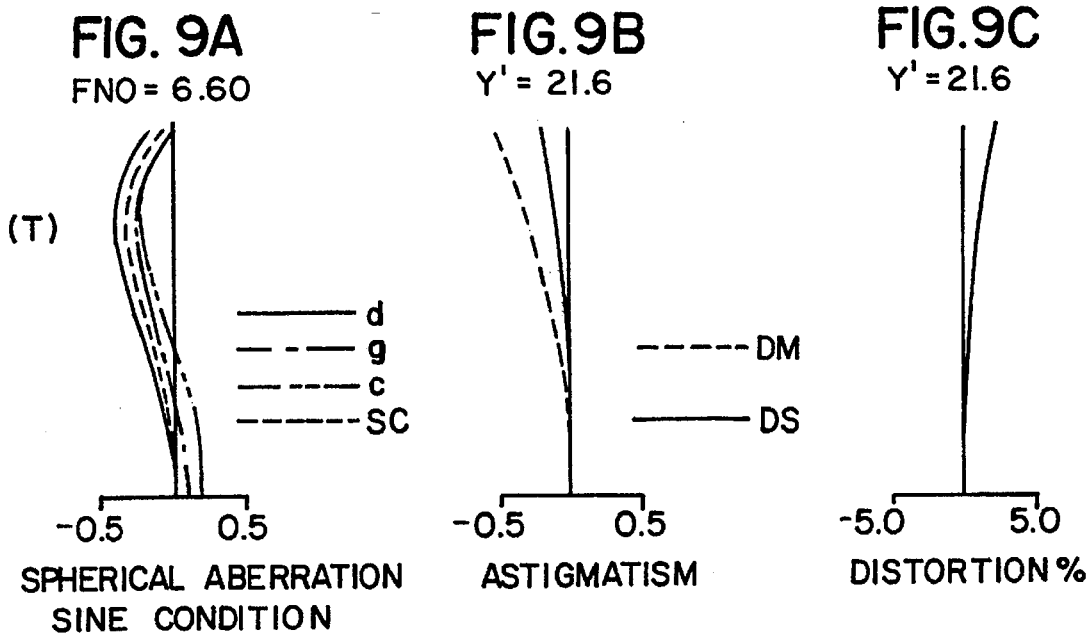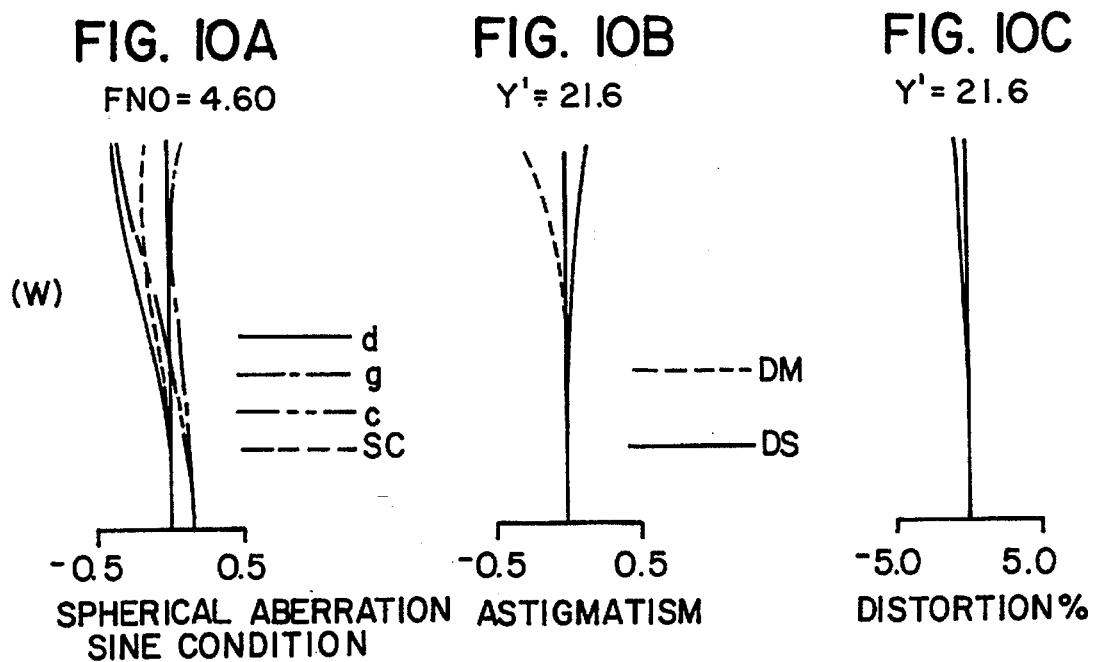

FNO=6.30

(M)
— d
—·— g
—··— c
----- SC

-0.5  0.5
SPHERICAL ABERRATION
SINE CONDITION

Y'=21.6

----- DM
—— DS

-0.5  0.5
ASTIGMATISM

Y'=21.6

-5.0  5.0
DISTORTION%

FNO=6.62

(T)
— d
—·— g
—··— c
----- SC

-0.5  0.5
SPHERICAL ABERRATION
SINE CONDITION

Y'=21.6

----- DM
—— DS

-0.5  0.5
ASTIGMATISM

Y'=21.6

-5.0  5.0
DISTORTION%

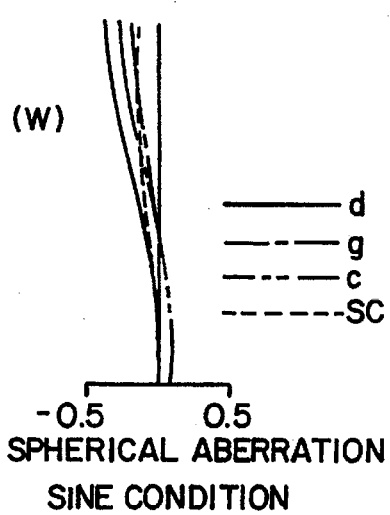
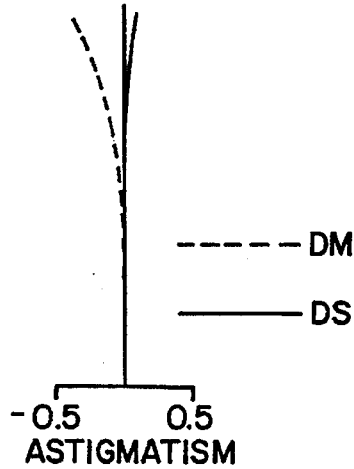
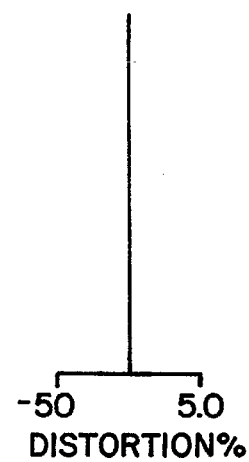
FIG. 13A
FNO= 4.60
FIG. 13B
Y' = 21.6
FIG. 13C
Y' = 21.6
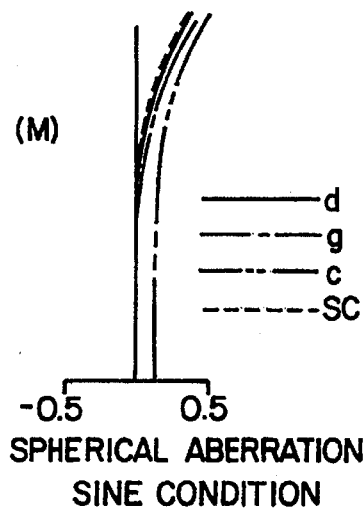
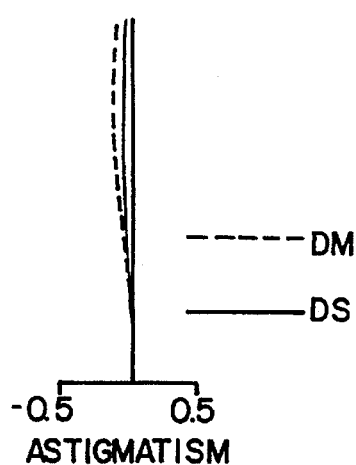
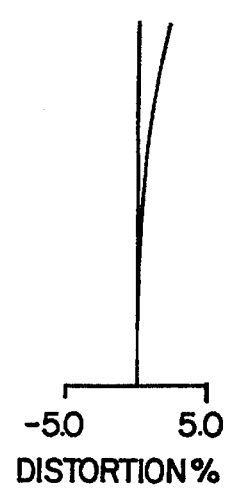
FIG. 14A
FNO= 6.20
FIG. 14B
Y' = 21.6
FIG. 14C
Y' = 21.6

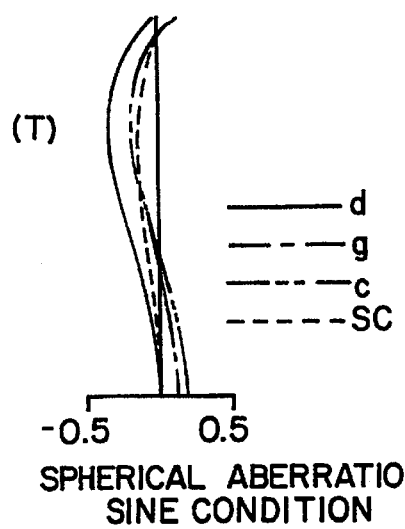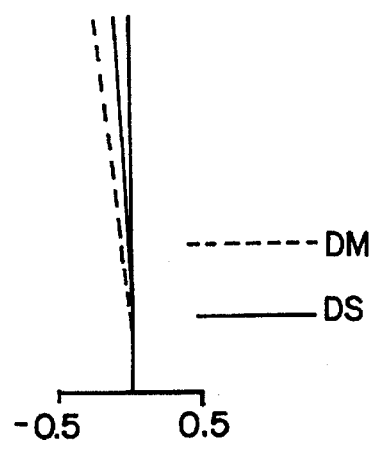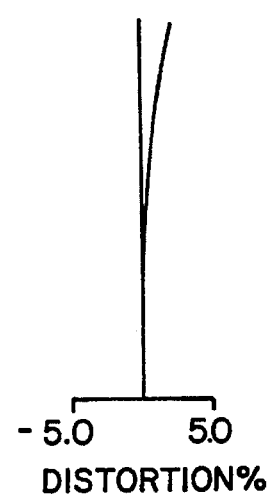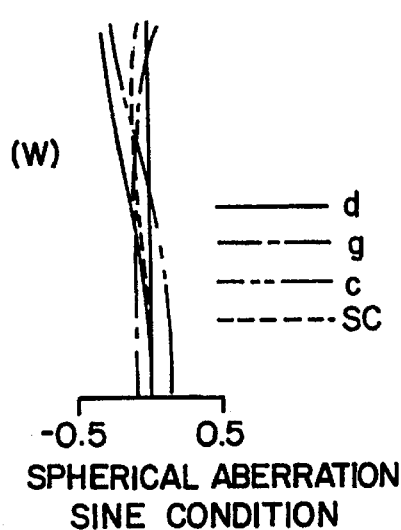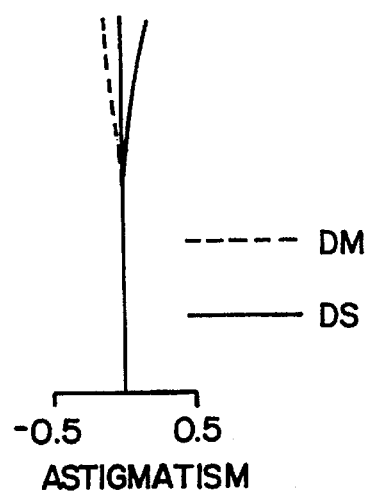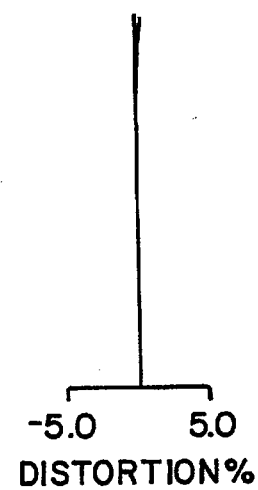

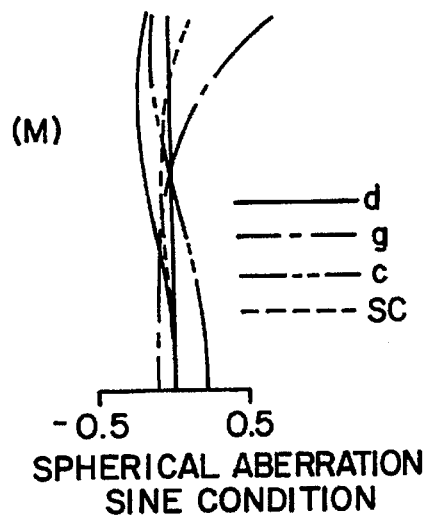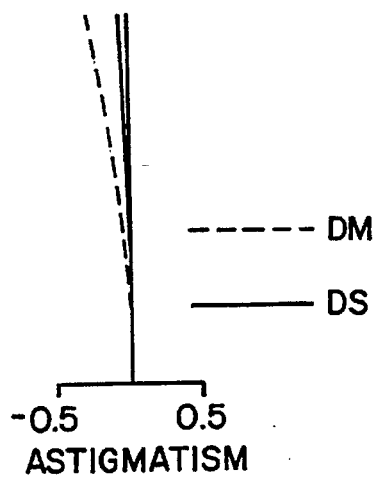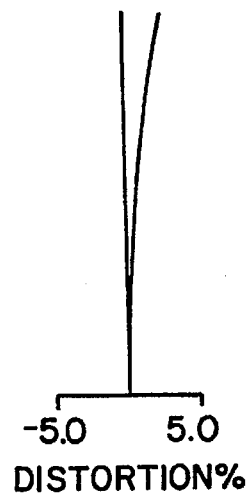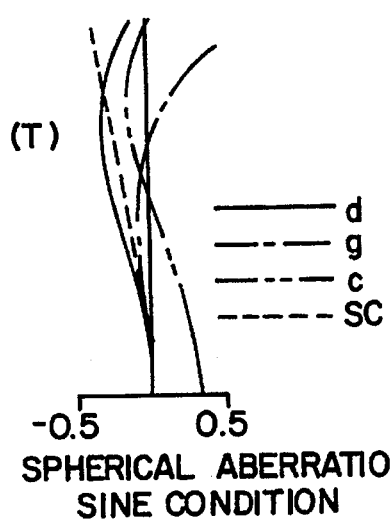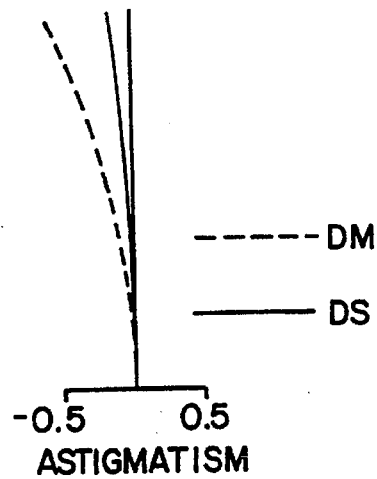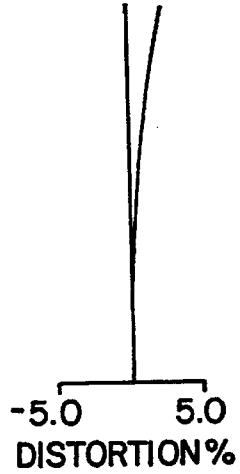

FNO=4.60
(W)
— d
—·— g
—··— c
----- SC
-0.5  0.5
SPHERICAL ABERRATION
SINE CONDITION

Y'=21.6
----- DM
——— DS
-0.5  0.5
ASTIGMATISM

Y'=21.6
-5.0  5.0
DISTORTION%

FNO=6.80
(M)
— d
—·— g
—··— c
----- SC
-0.5  0.5
SPHERICAL ABERRATION
SINE CONDITION

Y'=21.6
----- DM
——— DS
-0.5  0.5
ASTIGMATISM

Y'=21.6
-5.0  5.0
DISTORTION%

FNO=6.90

(T)

-0.5    0.5
SPHERICAL ABERRATION
SINE CONDITION

Y'=21.6

-0.5    0.5
ASTIGMATISM

Y'=21.6

-5.0    5.0
DISTORTION %

FNO=4.60

(W)

-0.5    0.5
SPHERICAL ABERRATION
SINE CONDITION

Y'=21.6

-0.5    0.5
ASTIGMATISM

Y'=21.6

-5.0    -5.0
DISTORTION%

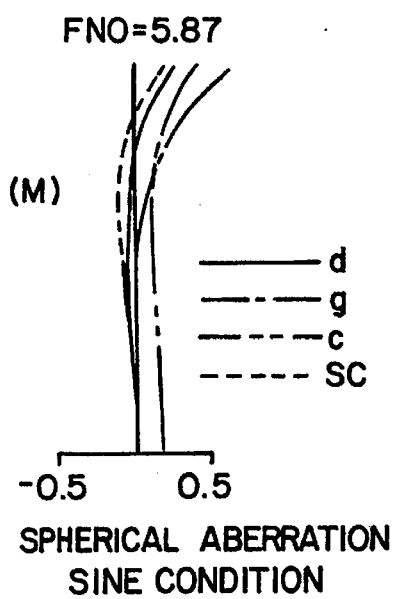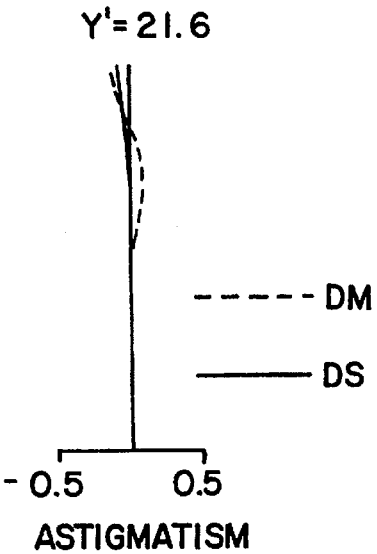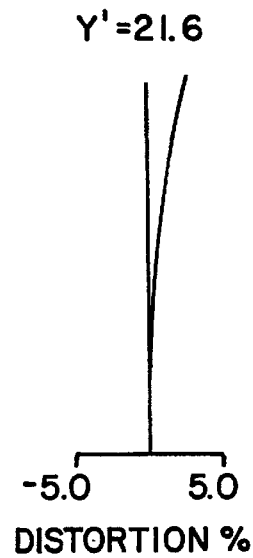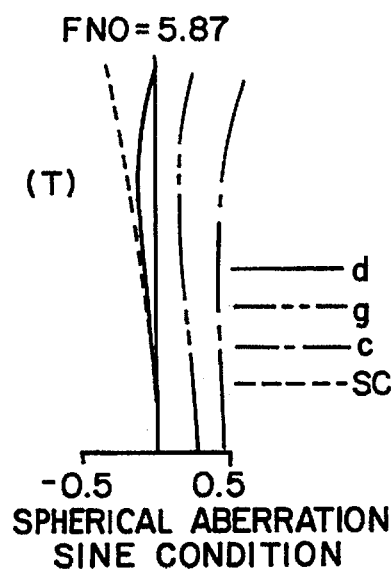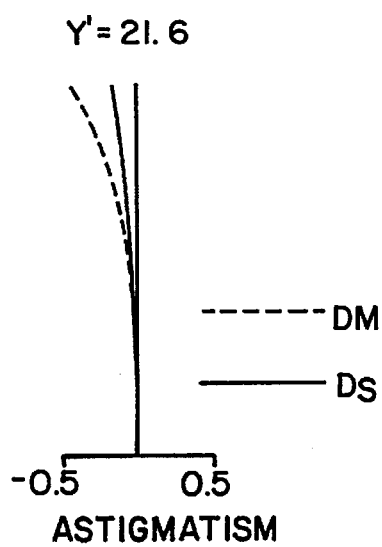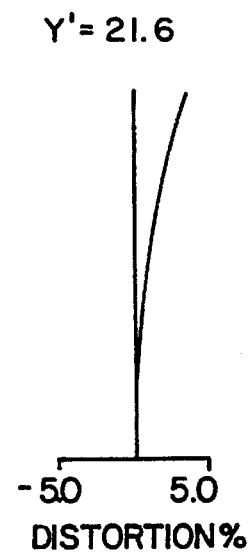

ZOOM LENS SYSTEM

BACKGROUND OF THE INVENTION

1. Field of the Invention

This invention pertains to a zoom lens system, and more particularly, to a high-power zoom lens system suitable as a photo-taking lens used in a camera.

2. Description of the Related Art

Conventionally proposed four-component zoom lens systems having a positive lens unit, a negative lens unit, a positive lens unit and a negative lens unit in that order have approximately a ×3 zoom ratio.

However, with said conventional model, if the zoom ratio is further increased, an adequate back focal distance cannot be preserved. In addition, if the zoom ratio is made ×3 or larger, transverse chromatic aberrations increase when the zoom lens system is in the telephoto condition.

SUMMARY OF THE INVENTION

The first object of the present invention is to provide a high-power zoom lens system in which an adequate back focal distance is preserved.

The second object of the present invention is to provide a high-power zoom lens system in which transverse chromatic aberrations are kept small throughout the entire zoom range.

In order to achieve these and other objects, the zoom lens system of the present invention comprises, from the object side, a first lens unit having a positive refractive power, a second lens unit having a negative refractive power, a third lens unit having a positive refractive power and a fourth lens unit having a negative refractive power, wherein the first through fourth lens units move such that the distance between the first and second lens units increases and the distance between the third and fourth lens units decreases during zooming from the wide angle toward the telephoto end of the zoom range and wherein the refractive power of the first lens unit and the refractive power of the fourth lens unit are appropriately prescribed.

BRIEF DESCRIPTION OF THE DRAWINGS

These and other objects and features of the present invention will be apparent from the following description with reference to the accompanying drawings.

FIG. 2 is a cross-sectional view showing the construction of a lens system of a second embodiment.

FIG. 6 is a cross-sectional view showing the construction of a lens system of a sixth embodiment.

FIGS. 7A–7C show aberrations in the first embodiment in the shortest focal length condition.

FIGS. 8A–8C show aberrations in the first embodiment in the middle focal length condition.

FIGS. 9A–9C show aberrations in the first embodiment in the longest focal length condition.

FIGS. 10A–10C show aberrations in the second embodiment in the shortest focal length condition.

FIGS. 13A–13C show aberrations in the third embodiment in the shortest focal length condition.

FIGS. 14A–14C show aberrations in the third embodiment in the middle focal length condition.

FIGS. 15A–15C show aberrations in the third embodiment in the longest focal length condition.

FIGS. 16A–16C show aberrations in the fourth embodiment in the shortest focal length condition.

FIGS. 17A–17C show aberrations in the fourth embodiment in the middle focal length condition.

FIGS. 18A–18C show aberrations in the fourth embodiment in the longest focal length condition.

FIGS. 23A–23C show aberrations in the sixth embodiment in the middle focal length condition.

FIGS. 24A–24C show aberrations in the sixth embodiment in the longest focal length condition.

DETAILED DESCRIPTION OF THE PREFERRED EMBODIMENT

Figure 1:
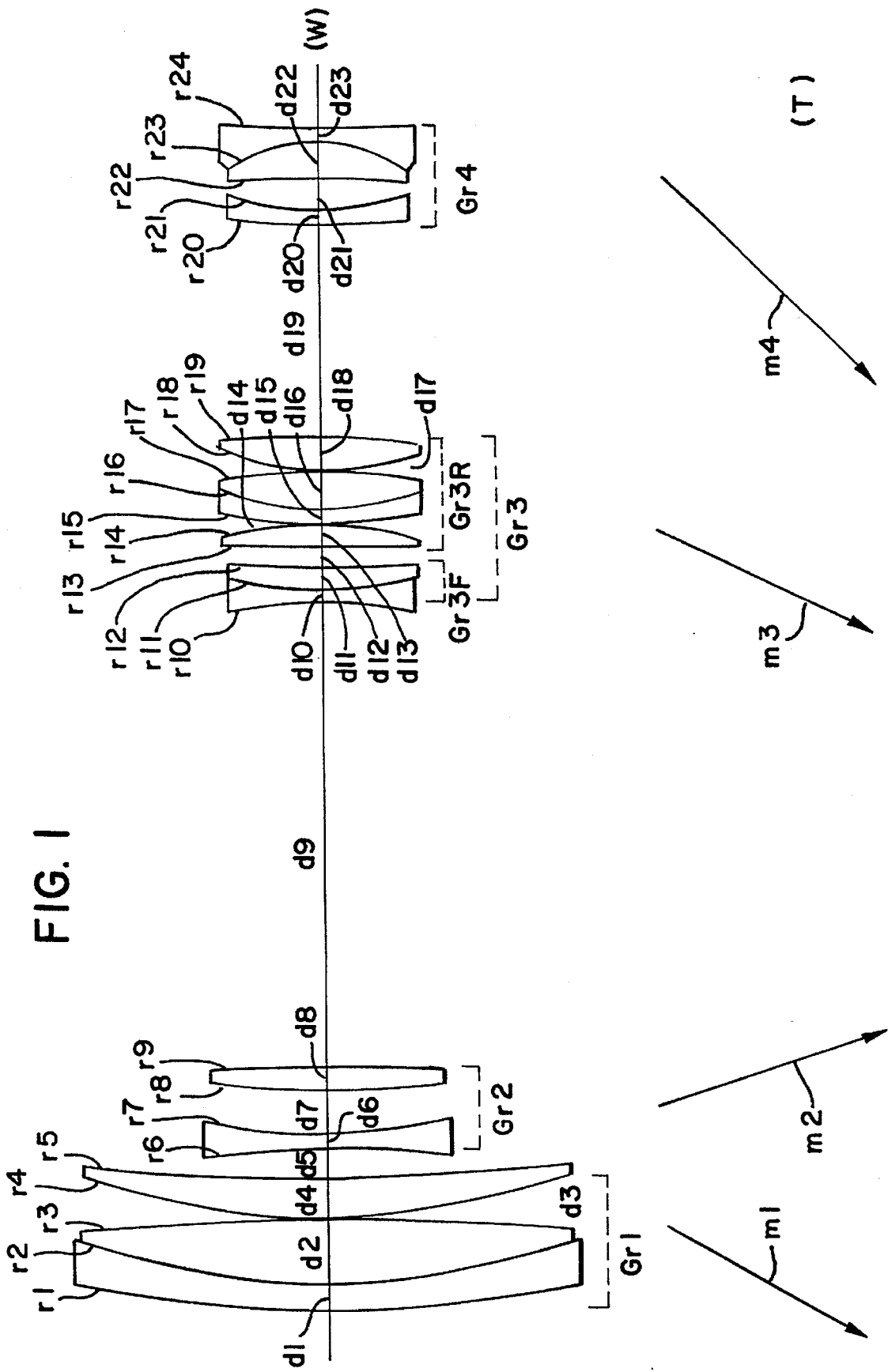
FIG. 1 is a cross-sectional view showing the construction of a lens system of a first embodiment.
Figure 3:
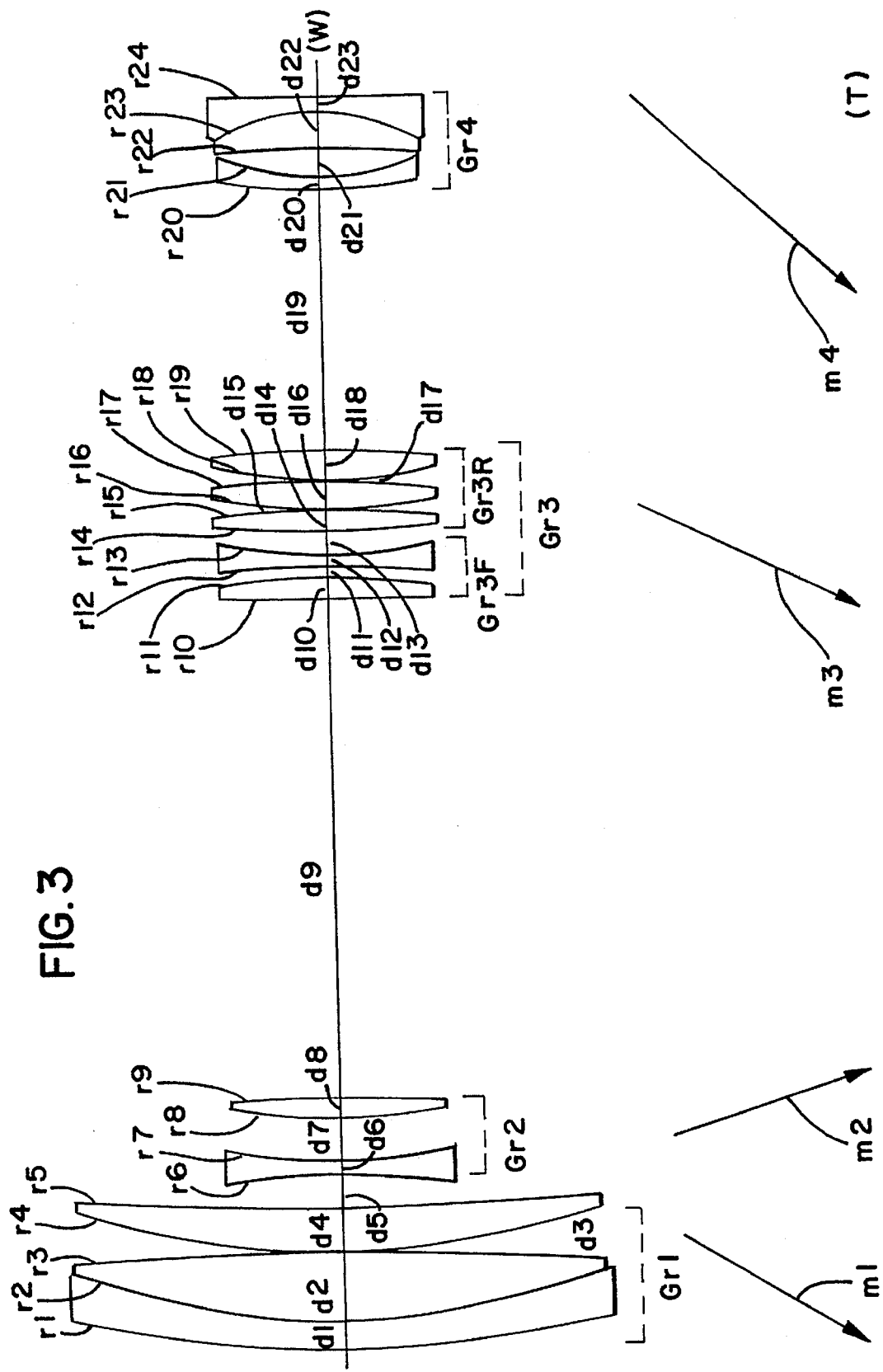
FIG. 3 is a cross-sectional view showing the construction of a lens system of a third embodiment.
Figure 4:
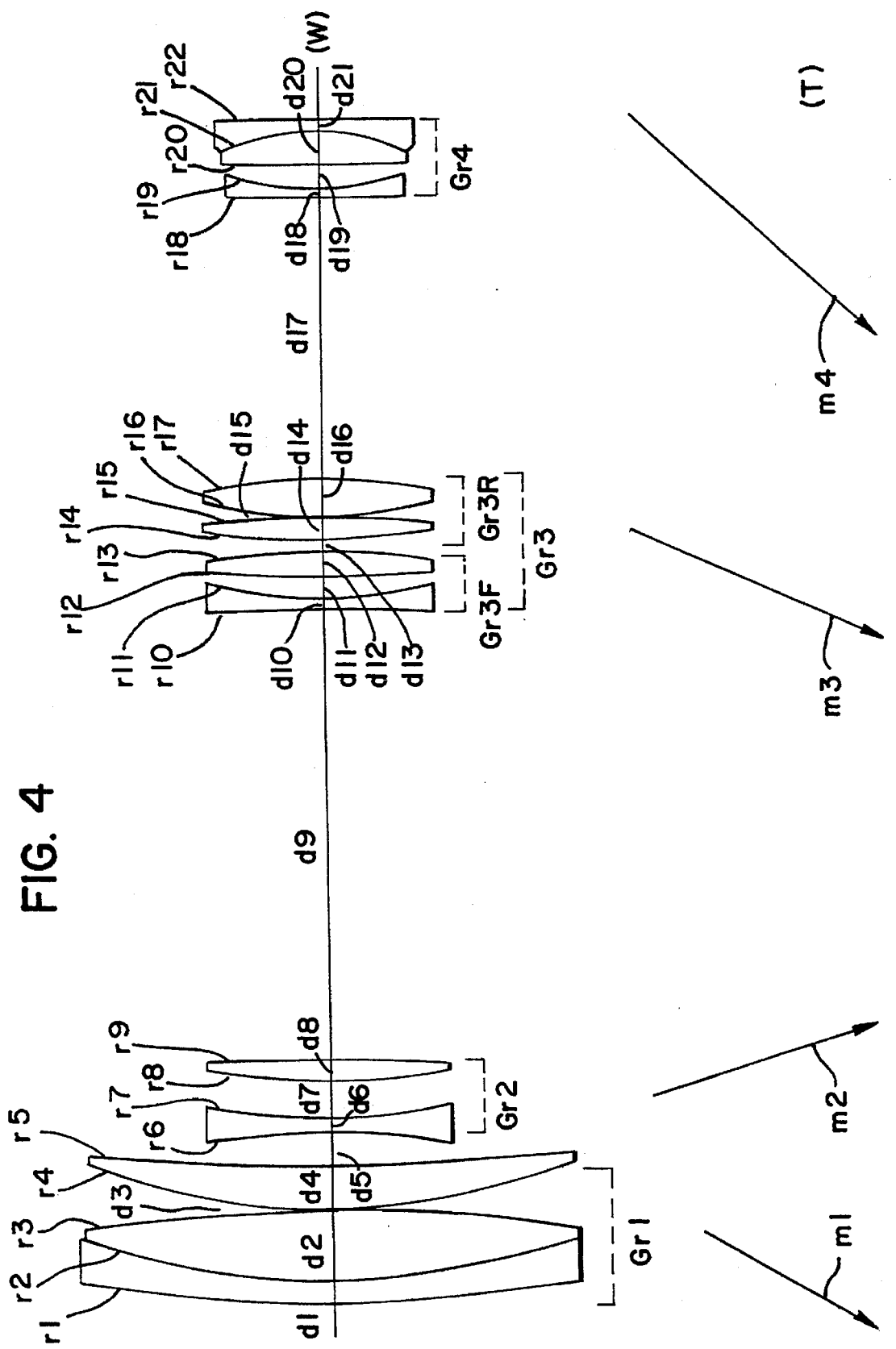
FIG. 4 is a cross-sectional view showing the construction of a lens system of a fourth embodiment.
Figure 5:
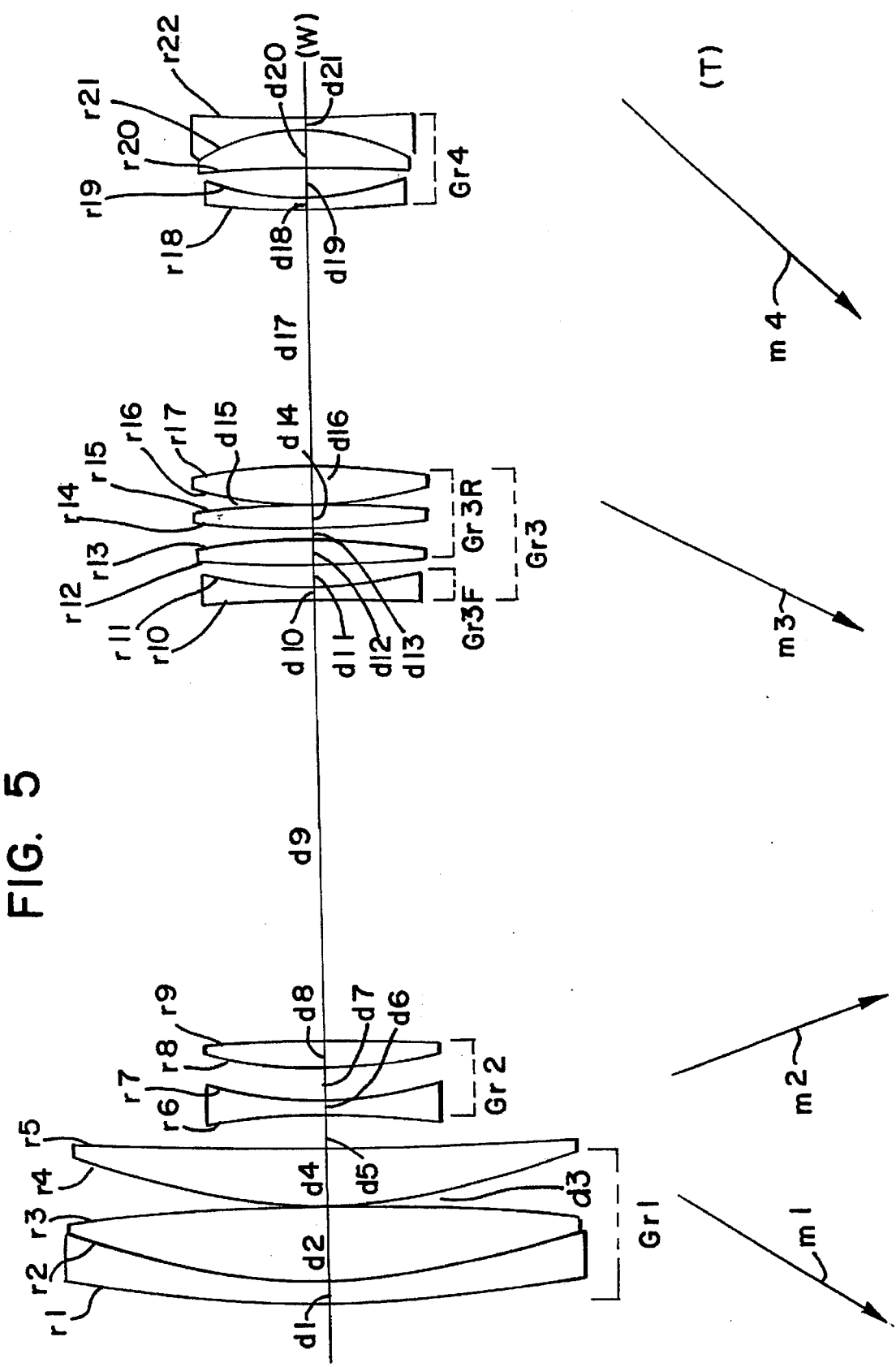
FIG. 5 is a cross-sectional view showing the construction of a lens system of a fifth embodiment.
Figure 11A:
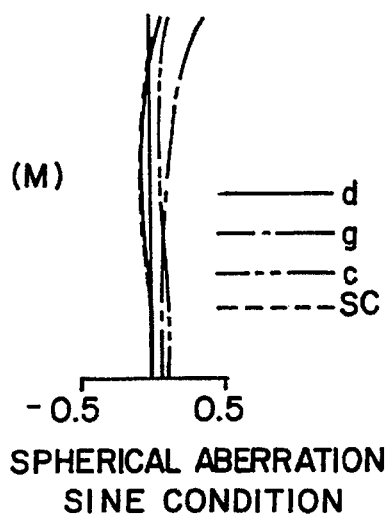
FIGS. 11A–11C show aberrations in the second embodiment in the middle focal length condition.
Figure 11B:
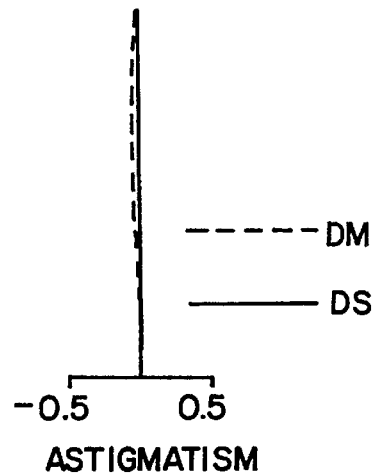
Figure 11C:
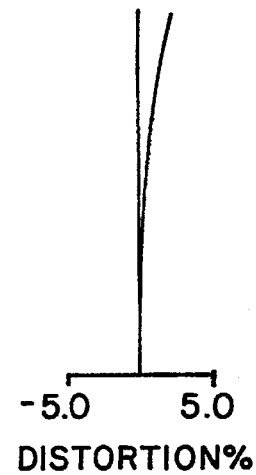
Figure 12A:
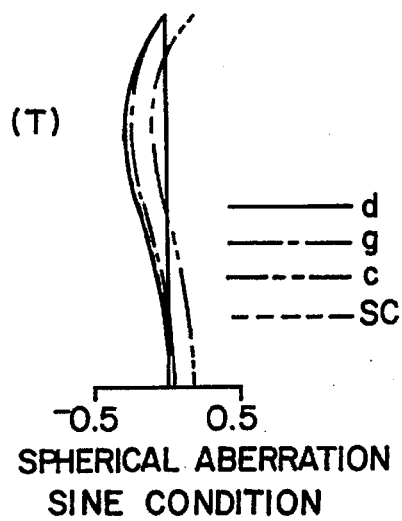
FIGS. 12A–12C show aberrations in the second embodiment in the longest focal length condition.
Figure 12B:
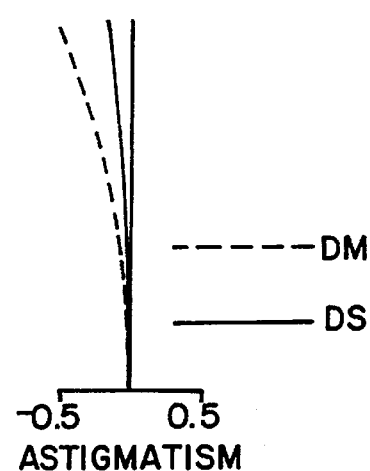
Figure 12C:
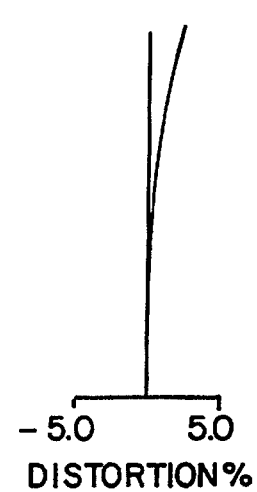
Figure 19A:
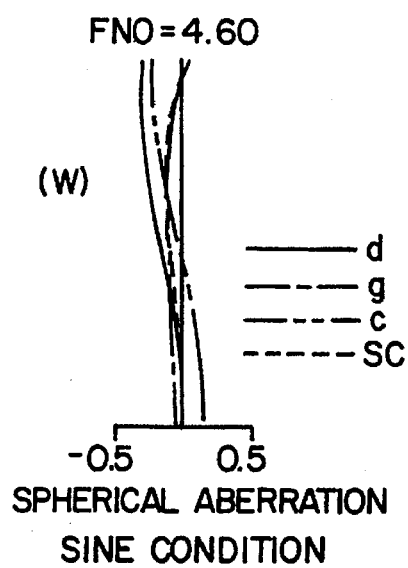
FIGS. 19A–19C show aberrations in the fifth embodiment in the shortest focal length condition.
Figure 19B:
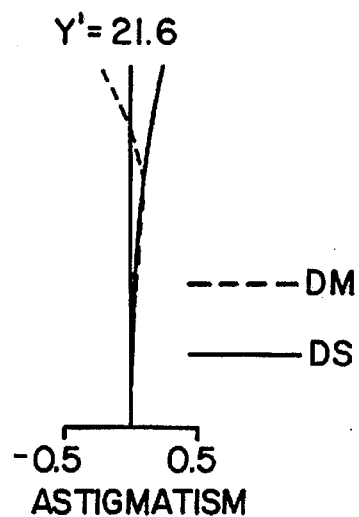
Figure 19C:
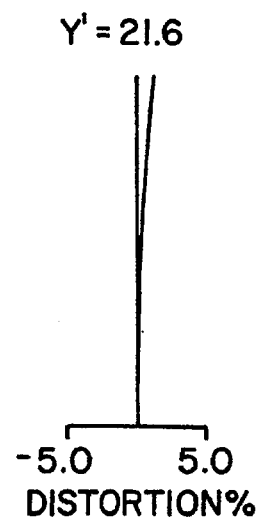
Figure 20A:
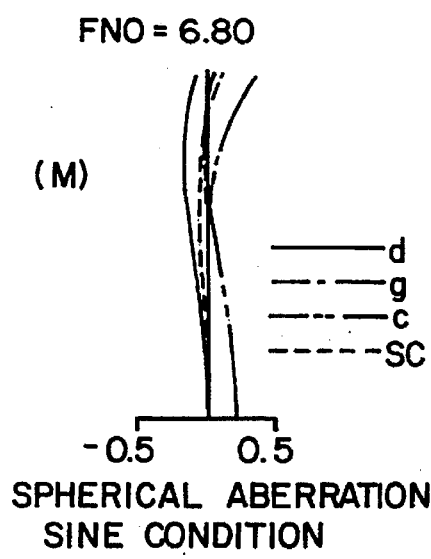
FIGS. 20A–20C show aberrations in the fifth embodiment in the middle focal length condition.
Figure 20B:
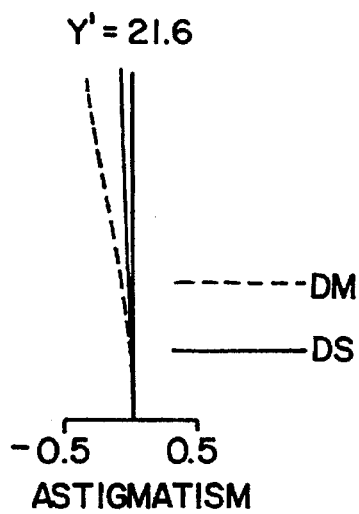
Figure 20C:
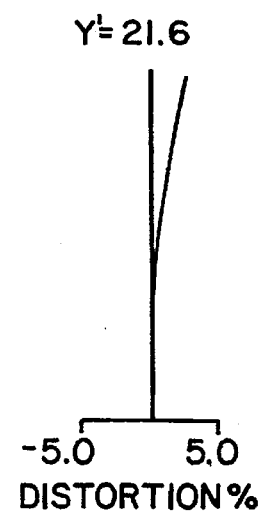
Figure 21A:
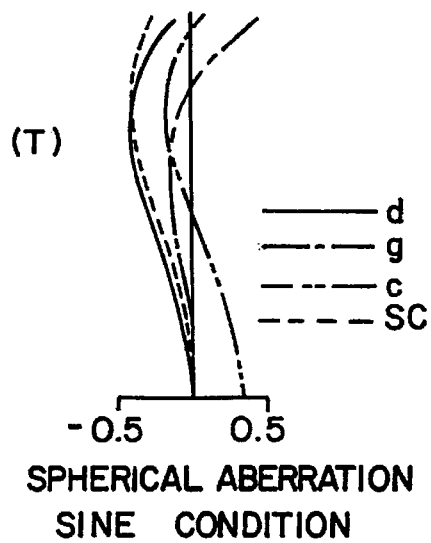
FIGS. 21A–21C show aberrations in the fifth embodiment in the longest focal length condition.
Figure 21B:
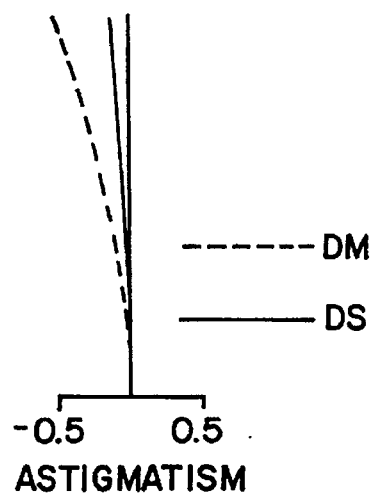
Figure 21C:
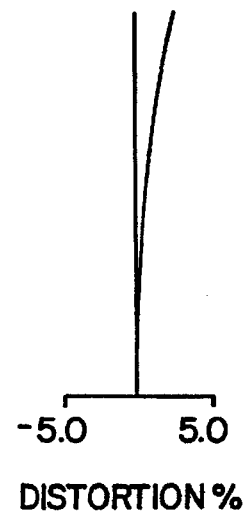
Figure 22A:
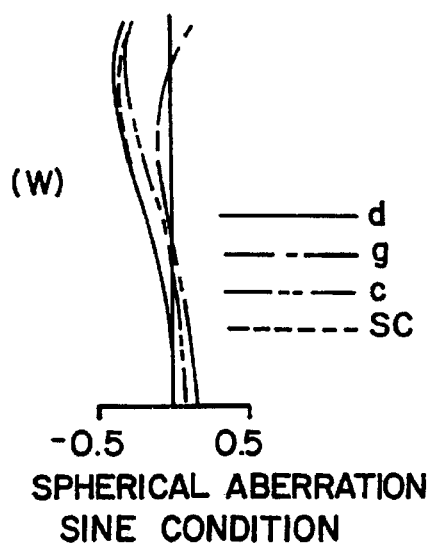
FIGS. 22A–22C show aberrations in the sixth embodiment in the shortest focal length condition.
Figure 22B:
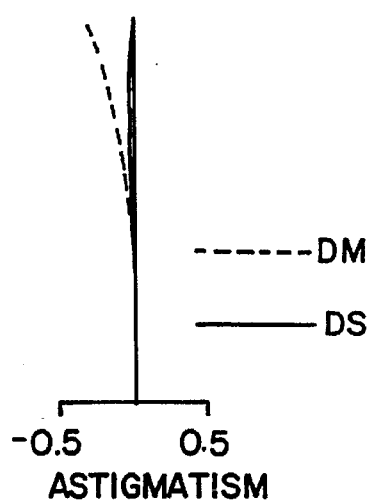
Figure 22C:
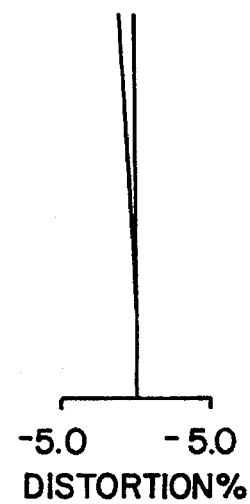

The first through sixth embodiments of the zoom lens system of the present invention are shown in Tables 1 through 6.

In each embodiment, ri (i=1, 2, 3, . . .) represents the radius of curvature of the ith lens surface from the object side; di (i=1, 2, 3, . . .) represents the ith axial distance from the object side; and Ni (i=1, 2, 3, . . .) and vi (i=1, 2, 3, . . .) represent the refractive power and the Abbe number, to the d-line, of the ith lens from the object side, respectively. In addition, focal length f and F-number FNO of the entire system are also indicated for the shortest focal length condition (W), the middle focal length condition (M) and the longest focal length condition (T).

TABLE 1

| f = 102.6~200.1~390.4, FNO = 4.60~6.30~6.60 | | | |
|---|---|---|---|
| radius of curvature | axial distance | refractive index | Abbe number |
| r1  157.857 | | | |
| | d1 3.300 | N1 1.74950 | v1 35.04 |
| r2  88.700 | | | |
| | d2 8.500 | N2 1.49310 | v2 83.58 |
| r3  −341.041 | | | |
| | d3 0.200 | | |

TABLE 1-continued f = 102.6~200.1~390.4, FNO = 4.60~6.30~6.60

| | radius of curvature | axial distance | refractive index | Abbe number |
|---|---|---|---|---|
| r4 | 91.443 | | | |
| | | d4 4.998 | N3 1.49310 | v3 83.58 |
| r5 | 295.776 | | | |
| | | d5 4.000~43.092~82.234 | | |
| r6 | −107.238 | | | |
| | | d6 1.800 | N4 1.71300 | v4 53.93 |
| r7 | 66.677 | | | |
| | | d7 5.207 | | |
| r8 | 93.472 | | | |
| | | d8 2.989 | N5 1.75520 | v5 27.51 |
| r9 | −622.960 | | | |
| | | d9 57.822~28.879~4.201 | | |
| r10 | −66.172 | | | |
| | | d10 1.700 | N6 1.71300 | v6 53.93 |
| r11 | 52.843 | | | |
| | | d11 2.566 | N7 1.58144 | v7 40.89 |
| r12 | 105.077 | | | |
| | | d12 2.695 | | |
| r13 | 1495.908 | | | |
| | | d13 2.800 | N8 1.48749 | v8 70.44 |
| r14 | −46.707 | | | |
| | | d14 0.200 | | |
| r15 | 75.764 | | | |
| | | d15 1.700 | N9 1.84666 | v9 23.82 |
| r16 | 37.959 | | | |
| | | d16 4.400 | N10 1.51680 | v10 64.20 |
| r17 | −91.581 | | | |
| | | d17 0.200 | | |
| r18 | 41.790 | | | |
| | | d18 4.311 | N11 1.51680 | v11 64.20 |
| r19 | −91.503 | | | |
| | | d19 25.612~15.463~0.999 | | |
| r20 | 135.341 | | | |
| | | d20 1.700 | N12 1.75450 | v12 51.57 |
| r21 | 31.936 | | | |
| | | d21 4.291 | | |
| r22 | −147.557 | | | |
| | | d22 4.500 | N13 1.67339 | v13 29.25 |
| r23 | −21.200 | | | |
| | | d23 1.800 | N14 1.71300 | v14 53.93 |
| r24 | 316.660 | | | |
| | | Σd = 147.290~147.291~147.290 | | |

TABLE 2 f = 102.5~200.0~390.1, FNO = 4.60~6.30~6.62

| | radius of curvature | axial distance | refractive index | Abbe number |
|---|---|---|---|---|
| r1 | 157.213 | | | |
| | | d1 3.300 | N1 1.74950 | v1 35.04 |
| r2 | 88.700 | | | |
| | | d2 9.090 | N2 1.49310 | v2 83.58 |
| r3 | −302.925 | | | |
| | | d3 0.200 | | |
| r4 | 87.864 | | | |
| | | d4 4.989 | N3 1.49310 | v3 83.58 |
| r5 | 235.117 | | | |
| | | d5 3.863~42.578~80.664 | | |
| r6 | −104.353 | | | |
| | | d6 1.800 | N4 1.71300 | v4 53.93 |
| r7 | 71.982 | | | |
| | | d7 5.202 | | |
| r8 | 104.848 | | | |
| | | d8 3.092 | N5 1.75520 | v5 27.51 |
| r9 | −486.232 | | | |
| | | d9 56.870~28.353~4.600 | | |
| r10 | −93.851 | | | |
| | | d10 1.700 | N6 1.71300 | v6 53.93 |
| r11 | 60.019 | | | |

TABLE 2-continued f = 102.5~200.0~390.1, FNO = 4.60~6.30~6.62

| | radius of curvature | axial distance | refractive index | Abbe number |
|---|---|---|---|---|
| | | d11 1.982 | | |
| r12 | 63.072 | | | |
| | | d12 2.988 | N7 1.61293 | v7 36.96 |
| r13 | 113.513 | | | |
| | | d13 2.683 | | |
| r14 | 250.350 | | | |
| | | d14 3.188 | N8 1.48749 | v8 70.44 |
| r15 | −58.125 | | | |
| | | d15 0.200 | | |
| r16 | 69.535 | | | |
| | | d16 1.700 | N9 1.84666 | v9 23.82 |
| r17 | 36.860 | | | |
| | | d17 4.791 | N10 1.51680 | v10 64.20 |
| r18 | −96.135 | | | |
| | | d18 0.200 | | |
| r19 | 44.043 | | | |
| | | d19 3.692 | N11 1.48749 | v11 70.44 |
| r20 | −150.605 | | | |
| | | d20 25.573~15.355~0.999 | | |
| r21 | 142.369 | | | |
| | | d21 1.700 | N12 1.75450 | v12 51.57 |
| r22 | 32.415 | | | |
| | | d22 4.278 | | |
| r23 | −154.466 | | | |
| | | d23 4.486 | N13 1.67339 | v13 29.25 |
| r24 | −21.300 | | | |
| | | d24 1.800 | N14 1.71300 | v14 53.93 |
| r25 | 283.830 | | | |
| | | Σd = 149.369~149.348~149.326 | | |

TABLE 3 f = 102.5~200.1~390.3, FNO = 4.60~6.20~6.54

| | radius of curvature | axial distance | refractive index | Abbe number |
|---|---|---|---|---|
| r1 | 142.710 | | | |
| | | d1 3.296 | N1 1.74950 | v1 35.04 |
| r2 | 84.932 | | | |
| | | d2 8.300 | N2 1.49310 | v2 83.58 |
| r3 | −494.257 | | | |
| | | d3 0.200 | | |
| r4 | 102.571 | | | |
| | | d4 4.700 | N3 1.49310 | v3 83.58 |
| r5 | 355.074 | | | |
| | | d5 4.000~43.258~88.212 | | |
| r6 | −97.704 | | | |
| | | d6 1.400 | N4 1.71300 | v4 53.93 |
| r7 | 60.846 | | | |
| | | d7 5.167 | | |
| r8 | 79.186 | | | |
| | | d8 2.000 | N5 1.75520 | v5 27.51 |
| r9 | −1716.767 | | | |
| | | d9 58.602~30.789~3.801 | | |
| r10 | 878.472 | | | |
| | | d10 2.410 | N6 1.51680 | v6 64.20 |
| r11 | −109.926 | | | |
| | | d11 1.536 | | |
| r12 | −148.680 | | | |
| | | d12 1.480 | N7 1.80741 | v7 31.59 |
| r13 | 59.466 | | | |
| | | d13 2.785 | | |
| r14 | 145.246 | | | |
| | | d14 2.589 | N8 1.48749 | v8 70.44 |
| r15 | −96.642 | | | |
| | | d15 0.100 | | |
| r16 | 82.480 | | | |
| | | d16 2.901 | N9 1.48749 | v9 70.44 |
| r17 | −132.272 | | | |
| | | d17 0.100 | | |

TABLE 3-continued f = 102.5~200.1~390.3, FNO = 4.60~6.20~6.54

| | radius of curvature | axial distance | refractive index | Abbe number |
|---|---|---|---|---|
| r18 | 51.542 | | | |
| | | d18 3.750 | N10 1.48749 | v10 70.44 |
| r19 | −104.191 | | | |
| | | d19 30.410~18.966~0.999 | | |
| r20 | 76.034 | | | |
| | | d20 1.400 | N11 1.75450 | v11 51.57 |
| r21 | 30.217 | | | |
| | | d21 3.599 | | |
| r22 | −108.973 | | | |
| | | d22 4.090 | N12 1.67339 | v12 29.25 |
| r23 | −22.122 | | | |
| | | d23 1.500 | N13 1.71300 | v13 53.93 |
| r24 | 480.277 | | | |
| | | Σd = 146.314~146.315~146.314 | | |

TABLE 4 f = 102.6~200.3~391.1, FNO = 4.60~5.80~6.90

| | radius of curvature | axial distance | refractive index | Abbe number |
|---|---|---|---|---|
| r1 | 188.993 | | | |
| | | d1 2.500 | N1 1.85000 | v1 40.04 |
| r2 | 88.006 | | | |
| | | d2 8.000 | N2 1.49310 | v2 83.58 |
| r3 | −210.439 | | | |
| | | d3 0.200 | | |
| r4 | 79.791 | | | |
| | | d4 4.600 | N3 1.48749 | v3 70.44 |
| r5 | 276.324 | | | |
| | | d5 4.000~40.951~83.231 | | |
| r6 | −84.282 | | | |
| | | d6 1.400 | N4 1.71300 | v4 53.93 |
| r7 | 65.658 | | | |
| | | d7 4.350 | | |
| r8 | 86.940 | | | |
| | | d8 2.400 | N5 1.75520 | v5 27.51 |
| r9 | −352.847 | | | |
| | | d9 52.349~27.963~3.801 | | |
| r10 | −554.394 | | | |
| | | d10 1.500 | N6 1.84666 | v6 23.83 |
| r11 | 48.833 | | | |
| | | d11 2.700 | | |
| r12 | 256.480 | | | |
| | | d12 3.000 | N7 1.59270 | v7 35.45 |
| r13 | −81.803 | | | |
| | | d13 1.400 | | |
| r14 | 80.485 | | | |
| | | d14 2.400 | N8 1.51680 | v8 64.20 |
| r15 | −253.109 | | | |
| | | d15 0.100 | | |
| r16 | 50.413 | | | |
| | | d16 4.500 | N9 1.48749 | v9 70.44 |
| r17 | −60.077 | | | |
| | | d17 31.682~19.117~0.999 | | |
| r18 | 195.848 | | | |
| | | d18 1.200 | N10 1.75450 | v10 51.57 |
| r19 | 33.636 | | | |
| | | d19 3.300 | | |
| r20 | −222.323 | | | |
| | | d20 3.200 | N11 1.67339 | v11 29.25 |
| r21 | −26.697 | | | |
| | | d21 1.200 | N12 1.69680 | v12 56.47 |
| r22 | 429.991 | | | |
| | | Σd = 135.981~135.981~135.981 | | |

TABLE 5 f = 102.6~200.3~391.4, FNO = 4.60~6.80~6.90

| | radius of curvature | axial distance | refractive index | Abbe number |
|---|---|---|---|---|
| r1 | 169.174 | | | |
| | | d1 2.500 | N1 1.85000 | v1 40.04 |
| r2 | 80.693 | | | |
| | | d2 7.800 | N2 1.49310 | v2 83.58 |
| r3 | −272.468 | | | |
| | | d3 0.200 | | |
| r4 | 76.426 | | | |
| | | d4 5.700 | N3 1.48749 | v3 70.44 |
| r5 | 553.897 | | | |
| | | d5 3.800~38.346~75.758 | | |
| r6 | −90.962 | | | |
| | | d6 1.400 | N4 1.80420 | v4 46.50 |
| r7 | 47.050 | | | |
| | | d7 3.400 | | |
| r8 | 53.036 | | | |
| | | d8 2.700 | N5 1.74000 | v5 28.26 |
| r9 | −297.497 | | | |
| | | d9 49.121~25.332~3.801 | | |
| r10 | −246.833 | | | |
| | | d10 1.500 | N6 1.84666 | v6 23.83 |
| r11 | 45.971 | | | |
| | | d11 2.700 | | |
| r12 | 170.154 | | | |
| | | d12 2.700 | N7 1.59270 | v7 35.45 |
| r13 | −75.384 | | | |
| | | d13 1.400 | | |
| r14 | 80.001 | | | |
| | | d14 2.700 | N8 1.51680 | v8 64.20 |
| r15 | −141.281 | | | |
| | | d15 0.100 | | |
| r16 | 46.799 | | | |
| | | d16 4.500 | N9 1.48749 | v9 70.44 |
| r17 | −58.861 | | | |
| | | d17 27.638~16.880~0.999 | | |
| r18 | 198.793 | | | |
| | | d18 1.200 | N10 1.80420 | v10 46.50 |
| r19 | 31.120 | | | |
| | | d19 3.300 | | |
| r20 | −222.323 | | | |
| | | d20 4.300 | N11 1.67339 | v11 29.25 |
| r21 | −21.349 | | | |
| | | d21 1.200 | N12 1.69680 | v12 56.47 |
| r22 | 298.186 | | | |
| | | Σd = 129.859~129.858~129.858 | | |

TABLE 6 f = 76.9~154.4~292.5, FNO = 4.60~5.87~5.87

| | radius of curvature | axial distance | refractive index | Abbe number |
|---|---|---|---|---|
| r1 | 72.631 | | | |
| | | d1 5.700 | N1 1.48749 | v1 70.44 |
| r2 | 720.269 | | | |
| | | d2 0.100 | | |
| r3 | 77.246 | | | |
| | | d3 2.500 | N2 1.72342 | v2 37.99 |
| r4 | 39.588 | | | |
| | | d4 8.680 | N3 1.48749 | v3 70.44 |
| r5 | 359.905 | | | |
| | | d5 2.310~34.360~63.275 | | |
| r6 | −134.793 | | | |
| | | d6 1.400 | N4 1.77250 | v4 49.62 |
| r7 | 32.710 | | | |
| | | d7 6.000 | | |
| r8 | 44.493 | | | |
| | | d8 2.550 | N5 1.75000 | v5 25.14 |
| r9 | 248.917 | | | |
| | | d9 32.751~14.826~5.029 | | |
| r10 | −38.615 | | | |

TABLE 6-continued

| | f = 76.9~154.4~292.5, FNO = 4.60~5.87~5.87 | | | |
|---|---|---|---|---|
| | radius of curvature | axial distance | refractive index | Abbe number |
| r11 | 48.306 | | | |
| | | d10 1.400 | N6 1.69680 | v6 55.46 |
| r12 | −96.873 | | | |
| | | d11 2.900 | N7 1.59551 | v7 39.22 |
| r13 | −206.323 | d12 6.600 | | |
| | | d13 2.700 | N8 1.51823 | v8 58.96 |
| r14 | −42.442 | | | |
| | | d14 0.200 | | |
| r15 | ∞ | | | |
| | | d15 1.400 | N9 1.75000 | v9 25.14 |
| r16 | 35.900 | | | |
| | | d16 4.700 | N10 1.51823 | v10 58.96 |
| r17 | −61.261 | | | |
| | | d17 0.200 | | |
| r18 | 45.763 | | | |
| | | d18 3.910 | N11 1.51823 | v11 58.96 |
| r19 | −75.456 | | | |
| | | d19 33.954~19.829~0.711 | | |
| r20 | 3594.536 | | | |
| | | d20 2.700 | N12 1.75000 | v12 25.14 |
| r21 | −54.749 | | | |
| | | d21 1.370 | | |
| r22 | −51.853 | | | |
| | | d22 1.400 | N13 1.77250 | v13 49.62 |
| r23 | 42.152 | | | |
| | Σd = 125.425~125.425~125.425 | | | |

FIGS. 1 through 6 show the first through sixth embodiments in the shortest focal length condition. The first through sixth embodiments each comprises, from the object side, first lens unit Gr1 having a positive refractive power, second lens unit Gr2 having a negative refractive power, third lens unit Gr3 having a positive refractive power and fourth lens unit Gr4 having a negative refractive power. Third lens unit Gr3 comprises, from the object side, front lens unit Gr3F having a negative refractive power and rear lens unit Gr3R having a positive refractive power.

Loci m1 through m4 in FIGS. 1 through 6 show the movement of first lens unit Gr1, second lens unit Gr2, third lens unit Gr3 and fourth lens unit Gr4, respectively, during zooming from the shortest focal length condition (W) to the longest focal length condition (T). As shown in each drawing, during zooming from the shortest focal length condition (W) to the longest focal length condition (T), first through fourth lens units Gr1 through Gr4 move such that the distance between first lens unit Gr1 and second lens unit Gr2 increases while the distance between second lens unit Gr2 and third lens unit Gr3 and the distance between third lens unit Gr3 and fourth lens unit Gr4 decrease.

In the first embodiment, first lens unit Gr1 comprises (1) a cemented lens of a negative meniscus lens having a concave surface on the image side and a biconvex lens, and (2) a positive meniscus lens having a convex surface on the object side; second lens unit Gr2 comprises (1) a biconcave lens and (2) a biconvex lens; third lens unit Gr3 comprises (1) front lens unit Gr3F, comprising a cemented lens of (i) a biconcave lens and (ii) a positive meniscus lens having a convex surface on the object side, and (2) rear lens unit Gr3R, comprising (i) a biconvex lens, (ii) a cemented lens of a negative meniscus lens having a concave surface on the image side and a biconvex lens, and (iii) a biconvex lens; and fourth lens unit Gr4 comprises (1) a negative meniscus lens having a concave surface on the image side and (2) a cemented lens of a positive meniscus lens having a convex surface on the image side and a biconcave lens.

In the second embodiment, first lens unit Gr1 comprises (1) a cemented lens of a negative meniscus lens having a concave surface on the image side and a biconvex lens, and (2) a positive meniscus lens having a convex surface on the object side; second lens unit Gr2 comprises (1) a biconcave lens and (2) a biconvex lens; third lens unit Gr3 comprises (1) front lens unit Gr3F comprising (i) a biconcave lens and (ii) a positive meniscus lens having a convex surface on the object side, and (2) rear lens unit Gr3R comprising (i) a biconvex lens, (ii) a cemented lens of a negative meniscus lens having a concave surface on the image side and a biconcave lens and (iii) a biconvex; and fourth lens unit Gr4 comprises (1) a negative meniscus lens having a concave surface on the image side and (2) a cemented lens of a positive meniscus lens having a convex surface on the image side and a biconcave lens.

In the third embodiment, first lens unit Gr1 comprises (1) a cemented lens of a negative meniscus lens having a concave surface on the image side and a biconvex lens and (2) a positive meniscus lens having a convex surface on the object side; second lens unit Gr2 comprises (1) a biconcave lens and (2) a biconvex lens; third lens unit Gr3 comprises (1) front lens unit Gr3F comprising (i) a biconvex lens and (ii) a biconcave lens and (2) rear lens unit Gr3R comprising three biconvex lenses; and fourth lens unit Gr4 comprises (1) a negative meniscus lens having a concave surface on the image side and (2) a cemented lens of a positive meniscus lens having a convex surface on the image side and a biconcave lens.

In the fourth embodiment, first lens unit Gr1 comprises (1) a cemented lens of a negative meniscus lens having a concave surface on the image side and a biconvex lens and (2) a positive meniscus lens having a convex surface on the object side; second lens unit Gr2 comprises (1) a biconcave lens and (2) a biconvex lens; third lens unit Gr3 comprises (1) front lens unit Gr3F comprising (i) a biconcave lens and (ii) a biconvex lens and (2) a rear lens unit Gr3R comprising two biconvex lenses; and fourth lens unit Gr4 comprises (1) a negative meniscus lens having a concave surface on the image side and (2) a cemented lens of a positive meniscus lens having a convex surface on the image side and a biconcave lens.

In the fifth embodiment, first lens unit Gr1 comprises (1) a cemented lens of a negative meniscus lens having a concave surface on the image side and a biconvex lens and (2) a positive meniscus lens having a convex surface on the object side; second lens unit Gr2 comprises (1) a biconcave lens and (2) a biconvex lens; third lens unit Gr3 comprises (1) front lens unit Gr3F comprising a biconcave lens and (2) rear lens unit Gr3R comprising three biconvex lenses; and fourth lens unit Gr4 comprises (1) a negative meniscus lens having a concave surface on the image side and (2) a cemented lens of a positive meniscus lens having a convex surface on the image side and a biconcave lens.

In the sixth embodiment, first lens unit Gr1 comprises (1) a positive meniscus lens having a convex surface on the object side and (2) a cemented of a negative meniscus lens having a concave surface on the image side and a positive meniscus lens having a convex surface on the object side; second lens unit Gr2 comprises (1) a biconcave lens and (2) a positive meniscus lens having a convex surface on the object side; third lens unit Gr3 comprises (1) front lens unit Gr3F comprising a cemented lens of a biconcave lens and a biconvex lens and (2) rear lens unit Gr3R comprising (i) a positive meniscus lens having a convex surface on the image side (ii) a cemented lens of a negative meniscus lens having a concave surface on the image side and a biconvex lens and (iii) a biconvex lens; and fourth lens unit Gr4 comprises (1) a biconvex lens and (2) a biconcave lens.

FIGS. 7A through 7C, FIGS. 10A through 10C, FIGS. 13A through 13C, FIGS. 16A through 16C, FIGS. 19A through 19C and FIGS. 22A through 22C show aberrations in the first through sixth embodiments in the shortest focal length condition. FIGS. 8A through 8C, FIGS. 11A through 11C, FIGS. 14A through 14C, FIGS. 17A through 17C, FIGS. 20A through 20C and FIGS. 23A through 23C show aberrations in the first through sixth embodiments in the middle focal length condition. FIGS. 9A through 9C, FIGS. 12A through 12C, FIGS. 15A through 15C, FIGS. 18A through 18C FIGS. 21A through 21C and FIGS. 24A through 24C show aberrations in the first to sixth embodiments in the longest focal length condition.

In the drawings, solid line (d) represents an aberration with regard to the d-line while the dashed line (g) represents an aberration with regard to the g-line and the two-dot chain line (c) represents an aberration with regard to the c-line. The dotted line (SC) represents the sine condition. The dotted line (DM) and solid line (DS) represent astigmatisms on the meridional surface and the sagittal surface, respectively.

The preferred construction of the zoom lens system of the present invention will now be explained. The first through sixth embodiments meet each of the conditions explained below, and accordingly, various effects may be produced.

The first through sixth embodiments are all doubletelephoto type zoom lens systems having a positive/negative/positive/negative refractive power arrangement and a ×3 or larger zoom ratio.

In a zoom lens system of such a construction, it is desirable that the following condition (1) be met.

$$-0.3 < \phi 1/\phi 4 < -0.1 \tag{1}$$

where,

φ1: the refractive power of the first lens unit, and

φ4: the refractive power of the fourth lens unit.

As can be seen from condition (1), the refractive power of the first lens unit is characteristically much smaller than that of the fourth lens unit in a zoom lens system having a positive/negative/positive/negative refractive power arrangement. If the lower limit of condition (1) above is not met, or in other words, if the positive refractive power of the first lens unit increases or the negative refractive power of the fourth lens unit decreases, the system's refractive power arrangement deviates from the telephoto type refractive power arrangement when the system is in the telephoto condition. Consequently, the entire length of the system increases. In addition, if the refractive power of the first lens unit increases, compensation for chromatic aberration and spherical aberration in the telephoto condition becomes difficult. Conversely, if the upper limit of condition (1) is not met, or in other words, if the negative refractive power of the fourth lens unit increases, the system's refractive power arrangement becomes close to that of a telephoto type system. Consequently, the back focal distance in the wide angle condition becomes too short, making it difficult to preserve adequate back focal distance. In a conventional model, if the zoom ratio is increased to ×3 or larger, it becomes impossible to preserve adequate back focal distance in the wide angle condition, which, in the embodiments of the present invention, is resolved by meeting condition (1) described above. Namely, by making the refractive power φ1 of first lens unit Gr1 relatively weaker than refractive power φ4 of fourth lens unit Gr4 as compared to the conventional model, adequate back focal distance can be preserved in the wide angle condition. On the other hand, in the telephoto condition, chromatic aberration and spherical aberration can be well compensated for. Further, because the refractive power arrangement is close to the telephoto type system's refractive power arrangement, the entire length of the system may be reduced.

In order to attain good balance over the system's entire length, as well as aberration compensation and back focal distance, it is preferred that the following condition (2) be met.

$$-20 < (\phi 2/fW) \times 100,000 < -2 \tag{2}$$

where,

φ2: the refractive power of second lens unit Gr2, and fW: the focal length of the entire system in the shortest focal length condition (W).

If the lower limit of condition (2) is not met, the system's construction becomes quite similar to the retro-focus type construction, and the system's length in the telephoto condition becomes too large. On the other hand, since the height of light entering third lens unit Gr3 becomes high in the wide angle condition, third lens unit Gr3 must have a strong refractive power. However, if the refractive power of third lens unit Gr3 is increased, spherical aberration compensation becomes difficult. Conversely, if the upper limit of condition (2) is not met, the system's construction becomes quite dissimilar to the retro-focus type construction, and the back focal distance becomes too short in the shortest focal length condition.

Further, it is preferred that the following condition (2') be met.

$$-8 < (\phi 2/fW) \times 100,000 < -2 \tag{2'}$$

If condition (2') is met, spherical aberration compensation becomes easier.

Second lens unit Gr2 and third lens unit Gr3 move during zooming from the wide angle side toward the telephoto side of the zoom range, such that the distance between them decreases. In the zoom lens systems of the present invention, because second lens unit Gr2 has a negative refractive power while third lens unit Gr3 has a positive refractive power, when the distance between second lens unit Gr2 and third lens unit Gr3 decreases during zooming from the wide angle toward the telephoto end of the zoom range as described above, the refractive power arrangement for second lens unit Gr2 and third lens unit Gr3 becomes the retro-focus type in the wide angle condition, thereby preserving adequate back focal distance. On the other hand, since second lens unit Gr2 and third lens unit Gr3 come close to one another in the telephoto condition, the refractive power arrangement for second lens unit Gr2 and third lens unit Gr3 deviates from the retro-focus type, thereby reducing the system's length.

The refractive power arrangement for third lens unit Gr3 is a negative/positive retro-focus type arrangement, said lens unit comprising, from the object side, front lens unit Gr3F having a negative refractive power and rear lens unit Gr3R having a positive refractive power. This prevents the back focal distance in the shortest focal length condition from becoming short as the zoom ratio increases.

Further, by meeting the following condition (3), adequate back focal distance may be preserved while good optical performance is maintained.

$$1 < T3 \tag{3}$$

where,

T3: the distance between front lens unit Gr3F and rear lens unit Gr3R of third lens unit Gr3.

If distance T3 between front lens unit Gr3F and rear lens unit Gr3R becomes smaller than the range of condition (3), it becomes necessary to increase the negative refractive power of front lens unit Gr3F and the positive refractive power of rear lens unit Gr3R in order to preserve adequate back focal distance. However, it would then be difficult to compensate for off-axial coma aberration in the wide angle condition and spherical aberration in the telephoto condition.

In order to make the back focal distance long in the shortest focal length condition by having a retro-focus type refractive power arrangement for third lens unit Gr3, it is necessary for the refractive power of front lens unit Gr3F to be negative, as described above. In addition, in order to compensate for axial chromatic aberration and lateral chromatic aberration in the shortest and middle focal length conditions under high zoom ratios, it is necessary to adequately perform chromatic compensation within front lens unit Gr3F. When the zoom ratio increases, the positions at which off-axial light beams pass through third lens unit Gr3 differ greatly between the wide angle condition and the telephoto condition. Therefore, if compensation for lateral chromatic aberration is attempted using both front lens unit Gr3F and rear lens unit Gr3R of third lens unit Gr3, the variation in lateral chromatic aberration during zooming cannot be adequately dealt with. Consequently, in order to adequately deal with the variation in lateral chromatic aberration during zooming, it is necessary that compensation for lateral chromatic aberration take place within front lens unit Gr3F and rear lens unit Gr3R only. Therefore, in the present invention, at least one positive lens and one negative lens are used in front lens unit Gr3F as described above, and condition (4), which is a condition for achromatism in front lens unit Gr3F, is met based on the fact that the refractive power of front lens unit Gr3F is negative (i.e., the refractive power of the positive lens is smaller than that of the negative lens). As a result of this construction, lateral chromatic aberration may be kept low throughout the entire zoom range even under a high zoom ratio.

$$v+<v- \tag{4}$$

Where, v+: Abbe number of the positive lens of front lens unit Gr3F, and v−: Abbe number of the negative lens of front lens unit Gr3F.

Embodiments 1 through 6 are all double telephoto type zoom lens systems having a positive/negative/positive/negative refractive power arrangement with a ×3 or larger zoom ratio. As described above, when the zoom ratio is increased to ×3 or larger in the conventional model having this refractive power arrangement, lateral chromatic aberration compensation becomes difficult. However, this can be resolved by meeting condition (4) above. In other words, by meeting condition (4) by virtue of a lens system having at least one positive lens and one negative lens in front lens unit Gr3F whose refractive power is negative, lateral chromatic aberration may be kept low throughout the entire zoom range even under a high zoom ratio.

Figure 25A:
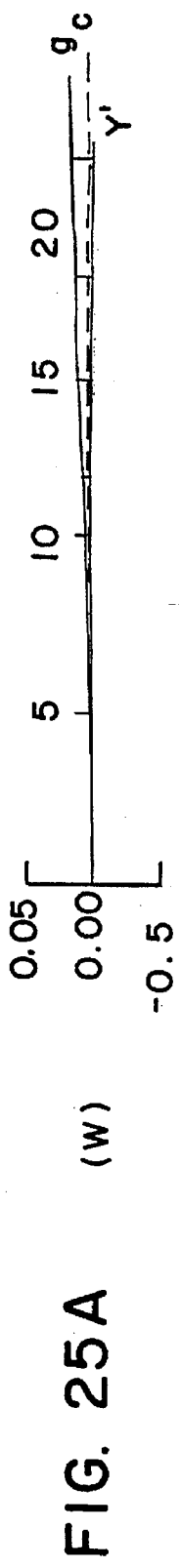
FIGS. 25A–25C show transverse chromatic aberrations in the first embodiment.
Figure 25B:
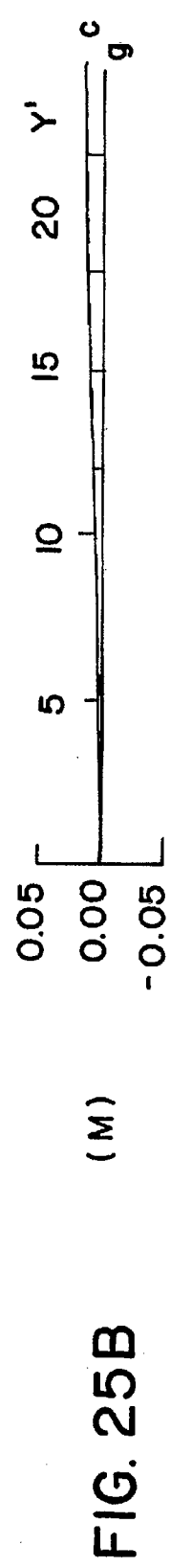
Figure 25C:
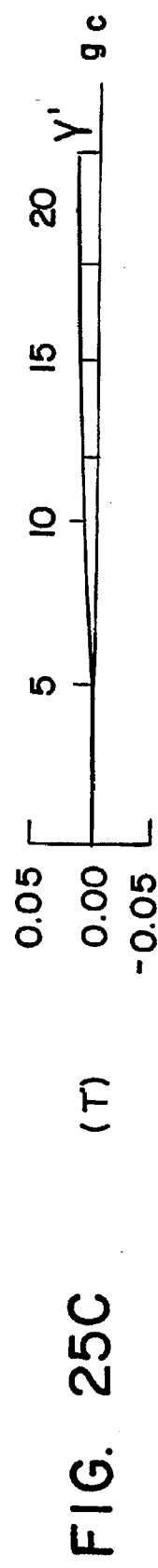
Figure 26A:
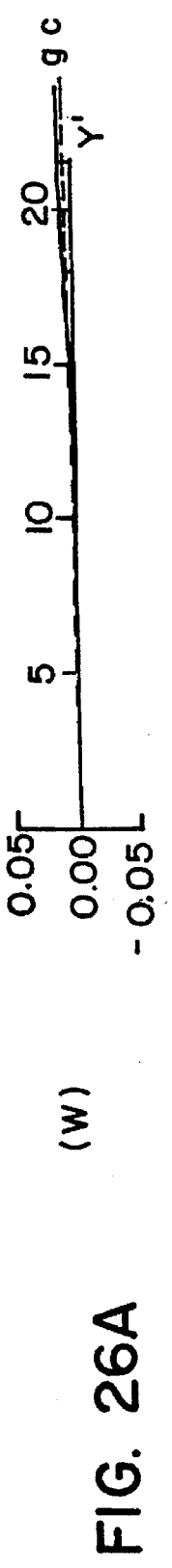
FIGS. 26A–26C show transverse chromatic aberrations in the second embodiment.
Figure 26B:
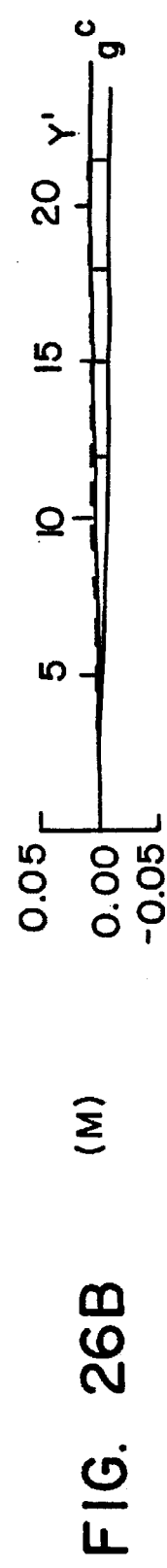
Figure 26C:
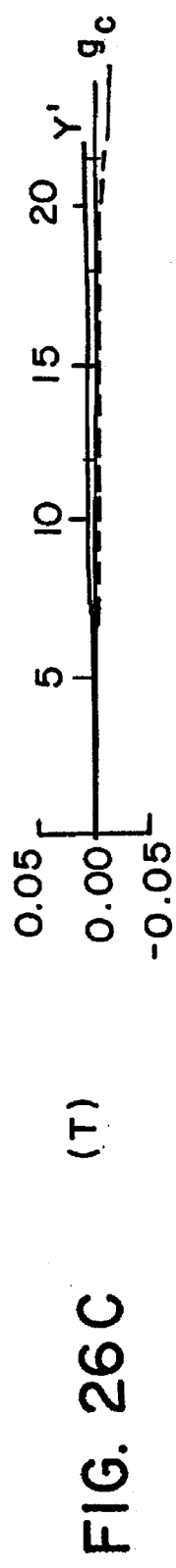
Figure 27A:
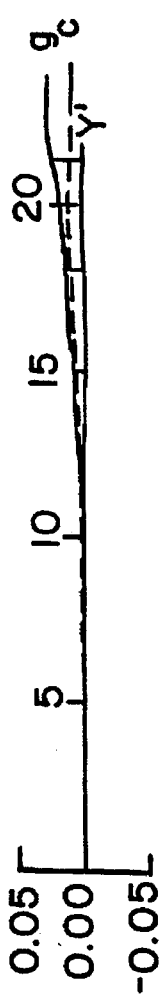
FIGS. 27A–27C show transverse chromatic aberrations in the sixth embodiment.
Figure 27B:
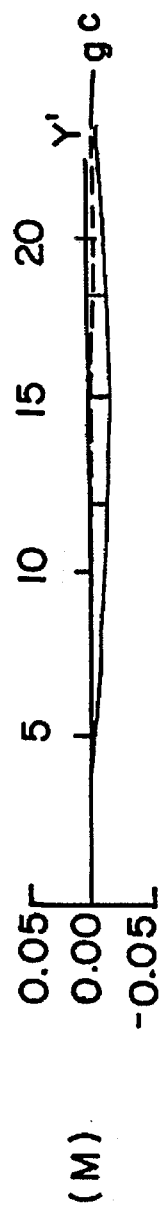
Figure 27C:
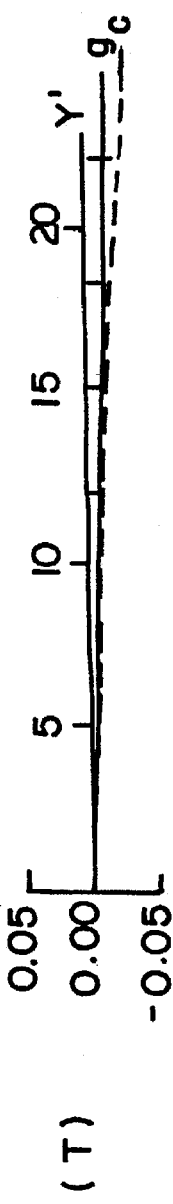

FIGS. 25, 26 and 27 show lateral chromatic aberrations in the first, second and sixth embodiments, respectively. In each chart, (W) indicates an aberration in the shortest focal length condition, (M) indicates an aberration in the middle focal length condition and (T) indicates an aberration in the longest focal length condition. Solid line (g) represents an aberration as to the g-line and dotted line (c) represents an aberration as to the c-line.

It is preferable that the following condition (5) be met as well.

$$-6<S3/fW<-0.1 \tag{5}$$

Where,

S3: the radius of curvature of the surface of third lens unit Gr3, which is closest to the object.

If the lower limit of condition (5) is not met, the degree of concavity of the surface of third lens unit Gr3 closest to the object becomes small and the degree of light refraction upward decreases, as a result of which the back focal distance in the shortest focal length condition (W) becomes too short. Conversely, if the upper limit of condition (4) is not met, due to aberrations occurring on this surface, compensation for off-axial coma aberration in the wide angle condition as well as for spherical aberration in the telephoto condition becomes difficult.

Table 7 shows the refractive power of each lens unit and the back focal distance in the shortest focal length condition for first through sixth embodiments. Table 8 shows the values which meet conditions (1) through (5) for the first through sixth embodiments.

TABLE 7

|  | ø1 | ø2 | ø3 | ø4 | LB |
| --- | --- | --- | --- | --- | --- |
| Embodiment 1 | 0.00700 | −0.00720 | 0.02225 | −0.02754 | 36.746 |
| Embodiment 2 | 0.00700 | −0.00720 | 0.02225 | −0.02754 | 37.697 |
| Embodiment 3 | 0.00661 | −0.00806 | 0.01979 | −0.02493 | 37.258 |
| Embodiment 4 | 0.00715 | −0.00775 | 0.01991 | −0.02450 | 36.987 |
| Embodiment 5 | 0.00790 | −0.00800 | 0.02203 | −0.02890 | 37.114 |
| Embodiment 6 | 0.00829 | −0.01314 | 0.02200 | −0.01869 | 39.032 |

In the table above,

φ1: refractive power of first lens unit

φ2: refractive power of second lens unit

φ3: refractive power of third lens unit

φ4: refractive power of fourth lens unit

LB: back focal distance

TABLE 8

|  | Condition 1 | Condition 2 (ø2/fW) | Condition 3 | Condition 4 | | Condition 5 |
| --- | --- | --- | --- | --- | --- | --- |
|  | ø1/ø4 | X100,000 | T3 | v− | v+ | S3/fW |
| Embodiment 1 | −0.25 | −7.02 | 2.695 | 53.93 | 40.89 | −0.646 |
| Embodiment 2 | −0.25 | −7.02 | 2.683 | 53.93 | 36.96 | −0.916 |
| Embodiment 3 | −0.27 | −7.86 | 2.785 | 31.59 | 64.20 | 8.570 |

TABLE 8-continued

|  | Condition 1 $\varnothing1/\varnothing4$ | Condition 2 ($\varnothing2/fW$) X100,000 | Condition 3 T3 | Condition 4 v− | Condition 4 v+ | Condition 5 S3/fW |
|---|---|---|---|---|---|---|
| Embodiment 4 | −0.29 | −7.37 | 1.400 | 28.83 | 35.45 | −5.409 |
| Embodiment 5 | −0.27 | −7.80 | 2.700 | 23.83 | 35.45 | −2.408 |
| Embodiment 6 | −0.44 | −17.09 | 6.600 | 55.46 | 39.22 | −0.502 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A zoom lens system, comprising from an object side:
a first lens unit having a positive refractive power;
a second lens unit having a negative refractive power;
a third lens unit having a positive refractive power; and
a fourth lens unit having a negative refractive power,
wherein the first through fourth lens units move such that the distance between the first and second lens units increases and the distance between the third and fourth lens units decreases during zooming from the wide angle toward the telephoto end of the zoom range, and wherein following conditions are fulfilled:

$$-0.3 < \phi1/\phi4 < -0.1$$

where
$\phi1$ represents the refractive power of the first lens unit, and
$\phi4$ represents the refractive power of the fourth lens unit.

2. A zoom lens system according to claim 1, wherein a following condition is fulfilled:

$$-20 < (\phi2/fW) \times 100,00 < -2$$

where
$\phi2$ represents the refractive power of the second lens unit, and
fW represents the focal length of the entire system in the shortest focal length condition.

3. A zoom lens system according to claim 2, wherein a following condition is fulfilled:

$$-8 < (\phi2/fW) \times 100,000 < -2.$$

4. A zoom lens system according to claim 1, wherein the third lens unit comprises a front lens unit having a negative refractive power and a rear lens unit having a positive refractive power.

5. A zoom lens system according to claim 4, wherein a following condition is fulfilled:

$$1 < T3$$

where
T3 represents the distance between the front lens unit and the rear lens unit.

6. A zoom lens system according to claim 4, wherein the front lens unit comprises a positive lens and a negative lens.

7. A zoom lens system according to claim 6, wherein a following condition is fulfilled:

$$v+ < v-$$

where
v+ represents Abbe number of the positive lens of front lens unit, and
v− represents Abbe number of the negative lens of front lens unit.

8. A zoom lens system according to claim 1, wherein a following condition is fulfilled:

$$-6 < S3/fW < -0.1$$

where
S3 represents the radius of curvature of the surface of the third lens unit, which is closest to the object.
fW represents the focal length of the entire system in the shortest focal length condition.

9. A zoom lens system, comprising from an object side:
a first lens unit having a positive refractive power;
a second lens unit having a negative refractive power;
a third lens unit having a positive refractive power; and
a fourth lens unit having a negative refractive power,
wherein the first through fourth lens units move such that the distance between the first and second lens units increases and the distance between the third and fourth lens units decreases during zooming from the wide angle toward the telephoto end of the zoom range,
wherein the third lens unit consists of from the object side a front lens unit having a negative refractive power and a rear lens unit having a positive refractive power and the front lens unit includes a positive lens and a negative lens, and
wherein following conditions are fulfilled:

$$1 < T3$$

$$v+ < v−$$

where
T3 represents the distance between front lens unit and the rear lens unit,
v+ represents Abbe number of the positive lens of front lens unit, and
v− represents Abbe number of the negative lens of front lens unit.

10. A zoom lens system according to claim 9, wherein a following condition is fulfilled:

$$-0.3 < \phi1/\phi4 < -0.1$$

where
$\phi1$ represents the refractive power of the first lens unit, and
$\phi4$ represents the refractive power of the fourth lens unit.

11. A zoom lens system according to claim 9, wherein a following condition is fulfilled:

$$-20 < (\phi 2/fW) \times 100{,}000 < -2$$

where
- $\phi 2$ represents the refractive power of the second lens unit, and
- fW represents the focal length of the entire system in the shortest focal length condition.

12. A zoom lens system according to claim 11, wherein a following condition is fulfilled:

$$-8 < (\phi 2/fW) \times 100{,}000 < -2.$$

13. A zoom lens system according to claim 9, wherein a following condition is fulfilled:

$$-6 < S3/fW < -0.1$$

where
- S3 represents the radius of curvature of the surface of the third lens unit, which is closest to the object, and
- fW represents the focal length of the entire system in the shortest focal length condition.

* * * * *